(12) United States Patent
Shioiri et al.

(10) Patent No.: US 7,670,244 B2
(45) Date of Patent: Mar. 2, 2010

(54) POWER TRANSMISSION SYSTEM

(75) Inventors: Hiroyuki Shioiri, Susono (JP); Ryuji Ibaraki, Susono (JP); Yasuo Hojo, Nagoya (JP); Hitoshi Nomasa, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 575 days.

(21) Appl. No.: 10/591,873

(22) PCT Filed: Mar. 9, 2005

(86) PCT No.: PCT/JP2005/004587

§ 371 (c)(1),
(2), (4) Date: Sep. 7, 2006

(87) PCT Pub. No.: WO2005/088170

PCT Pub. Date: Sep. 22, 2005

(65) Prior Publication Data

US 2007/0191178 A1 Aug. 16, 2007

(30) Foreign Application Priority Data

Mar. 11, 2004 (JP) .............................. 2004-069603

(51) Int. Cl.
*F16H 37/02* (2006.01)
*F16H 59/00* (2006.01)
*F16H 61/00* (2006.01)
*F16D 31/02* (2006.01)

(52) U.S. Cl. .......................... 475/210; 474/28; 477/45; 192/60

(58) Field of Classification Search ................. 475/208, 475/209, 210; 477/41, 44, 45; 474/11, 28; 192/60
See application file for complete search history.

(56) References Cited

U.S. PATENT DOCUMENTS

| | | | | |
|---|---|---|---|---|
| 4,469,012 A | * | 9/1984 | Bigo et al. | 91/491 |
| 4,518,069 A | * | 5/1985 | Elias | 192/60 |
| 4,581,896 A | | 4/1986 | Andresen et al. | |

(Continued)

FOREIGN PATENT DOCUMENTS

EP 0 312 275 4/1989

(Continued)

*Primary Examiner*—Roger Pang
(74) *Attorney, Agent, or Firm*—Oblon, Spivak, McClelland, Maier & Neustadt, L.L.P.

(57) ABSTRACT

A power transmission system having an input member (6) and an output member (2) for transmitting power, and an oil pump (7) for discharging oil by a relative rotation between a first (8, 70) and a second rotary members (9, 87, 88) which is driven by the power transmitted between the input member (6) and the output member (2), characterized in that: the input member (6) and the first rotary member (8, 70) are connected with each other in a power transmittable manner, and the output member (2) and the second rotary member (9, 87, 88) are connected with each other in a power transmittable manner; and characterized by comprising: a transmission member (11, 13, 76, 77) for connecting the first and the second rotary members in a power transmittable manner; and a control valve (9, 87, 88) for controlling a power transmission state between the first and the second rotary members, by controlling a discharge condition of the oil pump (7).

28 Claims, 12 Drawing Sheets

U.S. PATENT DOCUMENTS

| | | | |
|---|---|---|---|
| 4,932,510 A | | 6/1990 | Takemura et al. |
| 5,194,053 A | | 3/1993 | Sano et al. |
| 5,273,492 A | * | 12/1993 | Kashiwase et al. ............ 474/43 |
| 5,303,797 A | * | 4/1994 | Niikura ...................... 180/248 |
| 5,308,287 A | * | 5/1994 | Gunsing ...................... 474/28 |

FOREIGN PATENT DOCUMENTS

| | | |
|---|---|---|
| EP | 1 156 235 | 11/2001 |
| JP | 59-501917 | 11/1984 |
| JP | 62-286838 | 12/1987 |
| JP | 1-135927 | 5/1989 |
| JP | 1-188721 | 7/1989 |
| JP | 3-037427 | 2/1991 |
| JP | 4-60224 | 2/1992 |
| JP | 5-96565 | 12/1993 |
| JP | 7-259888 | 10/1995 |
| JP | 08 284977 | 11/1996 |
| JP | 10 220557 | 8/1998 |
| JP | 2001 323978 | 11/2001 |

* cited by examiner

POWER TRANSMISSION SYSTEM

TECHNICAL FIELD

This invention relates to a power transmission system arranged in the output side of a prime mover.

BACKGROUND ART

In the prior art, a vehicle is provided with a prime mover to generate a drive force for running, and output of the prime mover is transmitted to wheels through a power transmission system. This power transmission system comprises a clutch, a transmission, a forward/backward switching mechanism and so on. A type and an arrangement of those elements are determined depending on a specification of the vehicle such as a performance etc. One example of the vehicle having the power transmission system of this kind is disclosed in Japanese Patent Laid-Open No. 2001-323978. According to by this Laid-Open, the vehicle is provided with an engine as a prime mover, and a forward/backward switching mechanism, a belt-type continuously variable transmission, and a final speed reducing mechanism are arranged in the output side of the engine. This forward/backward switching mechanism has a planetary gear mechanism, a clutch and a brake, and further comprises a hydraulic control unit for controlling engagement/release of the clutch and the brake.

On the other hand, a belt type continuously variable transmission is equipped with a primary pulley and a secondary pulley, and a belt. In the belt type continuously variable transmission, oil pressures of oil chambers of the primary pulley and the secondary pulley are controlled by a hydraulic control unit. Moreover, a torque converter and a lockup clutch are arranged in parallel on the power transmission route between a crankshaft of an engine and an input shaft connected with the forward/backward switching mechanism. This torque converter comprises a pump impeller connected with the crankshaft, and a turbine runner communicated with the input shaft. The amount of oil fed to the torque converter and the engaging pressure of the lockup clutch are also controlled by the hydraulic control unit. Moreover, the hydraulic control unit comprises a hydraulic circuit, a solenoid valve, and an oil pump for feeding the oil to the hydraulic circuit is arranged in the hydraulic circuit. This oil pump has a body and a rotor. The body is fixed to the transaxle case, and the rotor is so connected with the pump impeller as to rotate integrally.

With the above-mentioned configuration, the engine power is transmitted to the rotor through the pump impeller, thereby driving the oil pump to discharge the oil. In case the lockup clutch is released, the power is transmitted by a kinetic energy of fluid when the engine power is transmitted to the torque converter. On the other hand, in case the lockup clutch is engaged, the power is transmitted by a frictional force when the engine power is transmitted to the torque converter. The engine power is thus transmitted to the forward/backward switching mechanism. Japanese Patent Laid-Open No. 10-220557 also discloses an example of the power transmission system having the oil pump.

According to the power transmission system disclosed in Japanese Patent Laid-Open No. 2001-323978, the engine power is transmitted to the wheels through the torque converter, the forward/backward switching mechanism, and the belt-type continuously variable transmission. However, on the other hand, it is necessary to provide the power transmission system separately with the oil pump for feeding the oil to the torque converter, the forward/backward switching mechanism, and the belt-type continuously variable transmission. This makes the power transmission system itself or including the peripheral equipments structurally large. Therefore, there is room for improving the vehicle mountability.

DISCLOSURE OF THE INVENTION

An object of the invention is to downsize the power transmission system entirely, and to provide the power transmission system improved in its mountability.

According to the invention, there is provided a power transmission system having an input member and an output member for transmitting power, and an oil pump for discharging oil by a relative rotation between a first and a second rotary members, which is driven by the power transmitted between the input member and the output member, characterized in that: the input member and the first rotary member are connected with each other in a power transmittable manner, and the output member and the second rotary member are connected with each other in a power transmittable manner; and characterized by comprising: a transmission member for connecting the first and the second rotary members in a power transmittable manner; and a control valve for controlling a power transmission state between the first and the second rotary members, by controlling a discharge condition of the oil pump.

According to the power transmission system of the invention, therefore, the power is transmitted between the input and the output members through the first and the second rotary members. Moreover, it is possible to control the power transmission state between the first and the second rotary members, by controlling the discharge condition of the oil pump. Specifically, the oil pump is a single element but have the function of a forced feeding device as well as a torque transmitting mechanism. For this reason, it is unnecessary to provide a torque transmitting mechanism in an output side of a prime mover in addition to the oil pump. This reduces the number of components so that the power transmission system is downsized. Consequently, the mountability of the power transmission system is improved.

According to the invention, moreover, there is provided a power transmission system, characterized in that: the oil pump is a radial piston pump comprising a piston which is arranged in any one of the first and the second rotary members, and which acts radially in a direction perpendicular to a common rotation axis of the first and the second rotary members.

According to the power transmission system of the invention, therefore, the oil is discharged by a movement of the piston in a direction radially perpendicular to the rotation axis of the first and the second rotary members. The power transmission system is thereby downsized in the direction of the rotation axis. Moreover, centrifugal force resulting from rotation of the first or the second rotary member can be utilized for moving the piston. Therefore, it is possible to eliminate an energizing force applying device such as an elastic member, and to reduce a spring constant.

According to the invention, moreover, there is provided a power transmission system, characterized by further comprising a control means for controlling the discharge condition of the oil pump by controlling the control valve on the basis of the operating condition of the vehicle.

According to the invention, moreover, there is provided a power transmission system, characterized in that: the transmission member is constructed to increase the torque transmitted between the first and the second rotary members in accordance with a reduction of the discharge amount of the oil pump, or a rise in a discharge pressure of the oil pump; and the control means comprises a means for controlling the control valve so that the discharge amount of the oil pump is reduced, or so that the discharge pressure of the oil pump is raised, according to the increase in a target value of the torque transmitted between the input and the output members.

According to the power transmission system of the invention, therefore, it is possible to control the power transmission state between the first and the second rotary members on the basis of the target value of the torque transmitted between the input and the output members.

According to the invention, moreover, there is provided a power transmission system, characterized in that the control means comprises a means for controlling the control valve so that the discharge amount or the discharge pressure of the oil pump is adjusted to the target value of the speed difference between the first and the second rotary member. The target value of the speed difference between the first and the second rotary members is determined by determining a target value of the torque transmitted between the first and the second rotary members so that the vibration and noise resulting from a fluctuation of the torque transmitted from the input member to the output member is suppressed within a permissible value, and then determining a target speed difference between the first and the second rotary members on the basis of the determined target value of the torque.

According to the invention, moreover, there is provided a power transmission system, characterized in that the control means comprises a means for controlling the control valve so that the discharge amount or the discharge pressure of the oil pump is adjusted in accordance with the fluctuation of the torque transmitted from the input member to the output member.

According to the invention, moreover, there is provided a power transmission system, characterized by comprising: a planetary gear mechanism having three rotary elements capable of rotating differentially, whereas the second rotary member comprises a first and a second construction members which are connected individually with two rotary elements of the planetary gear mechanism, and whereas the first and the second construction members are arranged coaxially in a predetermined direction; and a coupling mechanism for connecting the first rotary member selectively with the first or the second construction member in a torque transmittable manner, by moving the transmission member in a predetermined direction.

According to the power transmission system of the invention, therefore, the first rotary member is connected with the first or the second construction member in a torque transmittable manner by moving the transmission member in the predetermined direction. A changeover of a power transmitting route is thereby achieved.

According to the invention, moreover, there is provided a power transmission system: characterized in that the oil pump is a radial piston pump comprising a piston which is arranged in the first rotary member, and which acts radially in a direction perpendicular to the common rotation axis of the first and the second rotary member; the piston is equipped with the transmission member; the first and the second construction members are provided individually with a cam, to which the transmission member is contacted; the cams of the first and the second construction members are arranged coaxially in a predetermined direction; and characterized by comprising a smoothing mechanism for smoothing a movement of the transmission member between the cams of the first and the second construction members.

According to the power transmission system of the invention, therefore, the migration of the transmission member between the cams of first and second construction members is smoothened.

According to the invention, moreover, there is provided a power transmission system, characterized in that the planetary gear mechanism is a double-pinion type planetary gear mechanism, comprising, a sun gear as the first rotary element, a ring gear as the second rotary element, and a carrier as the third rotary element for holding a first pinion gear meshing with the sun gear and a second pinion gear meshing with the first pinion gear. In this power transmission system, the first construction member is connected with the sun gear, and the second construction member is connected with the carrier. Also, this power transmission system comprises a brake for allowing the ring gear to rotate, in case the transmission member and the first construction member are connected with each other in a power transmittable manner.

According to the power transmission system of the invention, therefore, the sun gear, the carrier and the ring gear rotate integrally when the transmission member and the first construction member is connected to transmit the power between the input and the output members. For this reason, it is possible to suppress the increase in the relative rotation speed between the sun gear and the first pinion gear, and to suppress the increase in the relative rotation speed between the ring gear and the second pinion gear. Moreover, it is possible to prevent the relative rotation itself.

According to the invention, moreover, there is provided a power transmission system, characterized by comprising a transmission, to which the power of the output member of the oil pump is transmitted.

According to the invention, moreover, there is provided a power transmission system, characterized by comprising a hydraulic control unit for controlling the transmission.

According to the invention, moreover, there is provided a power transmission system, characterized in that: the transmission comprises a hydraulic servo mechanism, and pressure or feeding amount of an operating oil to be fed to the hydraulic servo mechanism is controlled by the hydraulic control unit.

According to the invention, moreover, there is provided a power transmission system, characterized in that the output member functions also as an input shaft of the transmission.

According to the invention, moreover, there is provided a power transmission system: characterized by comprising a prime mover for generating driving force to run the vehicle; and characterized in that the power of the prime mover is transmitted to the input member.

According to the invention, moreover, there is provided a power transmission system, characterized in that the prime mover is an engine, and the input member is a crankshaft of the engine.

According to the invention, moreover, there is provided a power transmission system, characterized by comprising a hydraulic control unit, to which the operating oil discharged from the oil pump is fed.

According to the invention, moreover, there is provided a power transmission system, characterized in that the power of the prime mover for generating driving force to run the vehicle is transmitted to wheels through the oil pump, the transmission, and a deferential.

According to the invention, moreover, there is provided a power transmission system, characterized in that the transmission comprises a forward/backward switching mechanism and a continuously variable transmission.

According to the invention, moreover, there is provided a power transmission system, characterized in that: the power of the prime mover is transmitted to the second rotary member through the first rotary member; the piston is arranged in the first rotary member; the cum is arranged in a circumferential direction of the second rotary member; and the piston moves radially in consequence of its rotational transfer in the circumferential direction of the cum resulting from the relative rotation between the first and the second rotary members.

According to the invention, moreover, there is provided a power transmission system, characterized in that: the control valve comprises a spool in the action of which is controlled by energizing a solenoid, and a port connected with an oil discharging passage of the oil pump; and the section area of the port is controlled by the action of the spool thereby controlling the discharge amount of the oil pump.

According to the invention, moreover, there is provided a power transmission system comprising a prime mover for generating a driving force to run the vehicle, characterized in that: the power of the prime move is transmitted from the input member to the output member; the control valve comprises a port connected with an oil discharging passage of the oil pump; and the control means comprises a means for controlling the section area of the port of the control valve on the basis of a result of a comparison between an actual speed and a target speed of the prime mover.

According to the invention, moreover, there is provided a power transmission system, comprising an oil requiring portion to which the oil discharged from the oil pump is fed, characterized in that: the control valve comprises a port connected with an oil discharging passage of the oil pump; and the control means comprises a means for controlling the section area of the port of the control valve on the basis of a result of a determination of the oil pressure and the feeding amount required in the oil requiring portion. According to the invention, moreover, there is provided a power transmission system, characterized in that: the control valve comprises a port connected with an oil discharging passage of the oil pump; and the control means comprises a means for controlling the section area of the port of the control valve on the basis of a result of a determination of a speed difference between the first and the second rotary members.

According to the invention, moreover, there is provided a power transmission system, characterized in that: the oil discharged from the oil pump to the oil discharging passage is fed to the hydraulic control unit through the control valve. In this power transmission system, the control valve comprises: a port, which is connected with an oil discharging passage; a spool, which is reciprocatable in an axial direction, and which controls the section area of the port; an elastic member for applying an elastic force to the spool in the axial direction; a control port, to which a control oil Pressure regulated by the hydraulic control unit is inputted, and which applies a force to the spool in a same direction as the force applied by the elastic member; and a feedback port, which is connected with the oil discharging passage of the oil pump, and to which the oil pressure for applying a force to the spool in a direction opposite to the force applied to the spoil by the elastic member (112) is inputted.

According to the invention, moreover, there is provided a power transmission system, characterized in that the control means comprises a means for controlling a discharge pressure of the oil pump on the basis of a result of a comparison between an actual speed and a target speed of the prime mover.

According to the invention, moreover, there is provided a power transmission system comprising an oil requiring portion to which the oil discharged from the oil pump is fed, characterized in that the control means comprises a means for controlling the discharge pressure of the oil pump by controlling the control valve on the basis of a result of a determination of the required oil pressure and the required feeding amount of the oil in the oil requiring portion.

According to the invention, moreover, there is provided a power transmission system, characterized in that the control means comprises a means for controlling the discharge pressure of the oil pump by controlling the control valve on the basis of a result of a determination of a speed difference between the first and the second rotary members.

BEST MODE FOR CARRYING OUT THE INVENTION

Next, here will be described the present invention in connection with its specific examples. This invention relates to a power transmission system, in which an oil pump has functions for discharging oil and for transmitting a power. Various embodiments of this power transmission system will be explained in due course.

Embodiment 1

Figure 1:
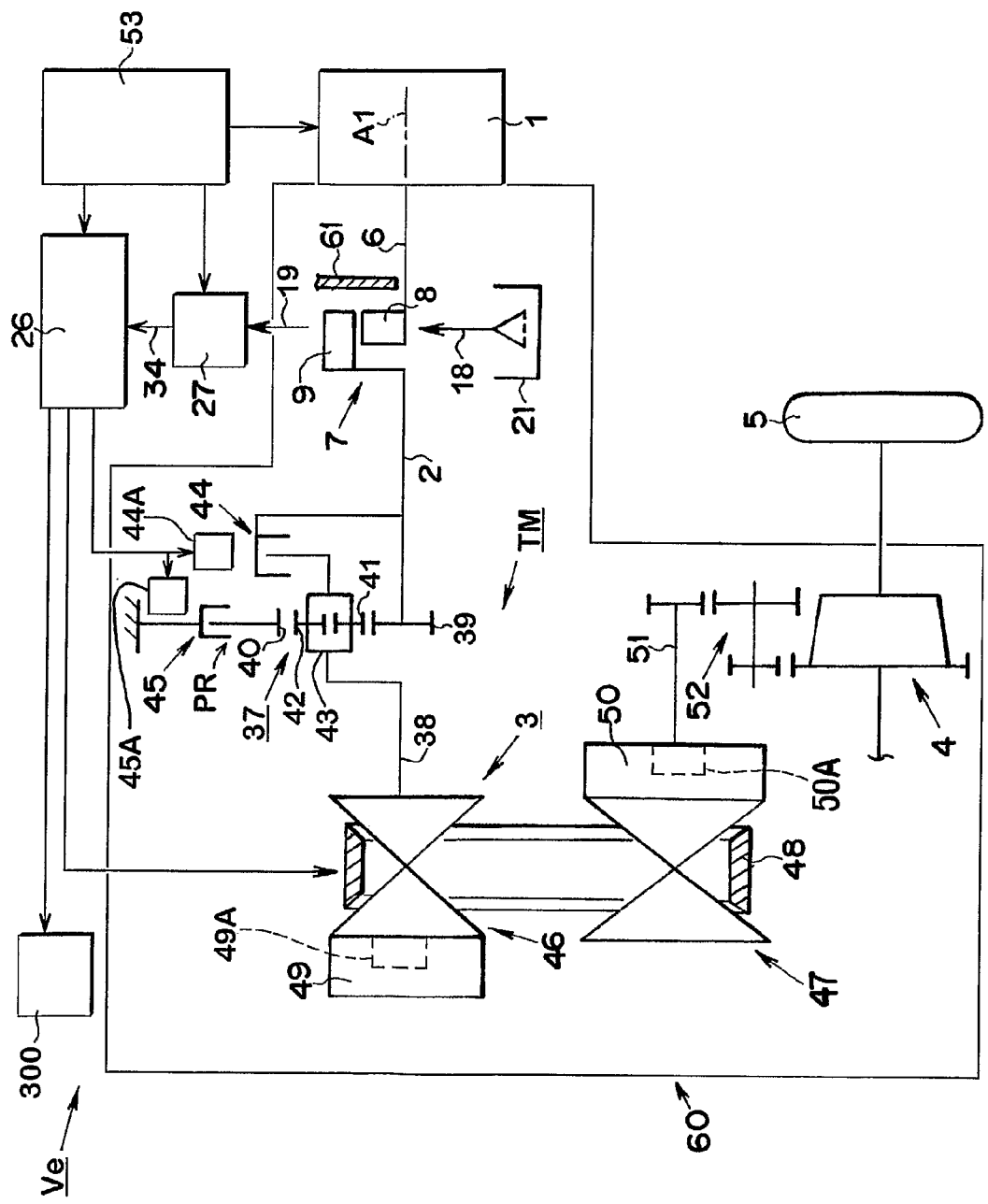
FIG. 1 is a conceptional view showing a vehicle having a power transmission system according to the invention, and a control line thereof.

FIG. 1 schematically shows one example of a power train and a control line of a vehicle Ve having the power transmission system of the invention. The power train of the vehicle Ve will be described first of all. An engine 1 is provided as a prime mover for generating a driving force for running the vehicle Ve, and an engine torque is transmitted to wheel 5 through an input shaft 2, a belt type continuously variable transmission 3 and a differential 4. The input shaft 2, the belt type continuously variable transmission 3 and the differential 4 are accommodated in a casing 60.

Figure 2:
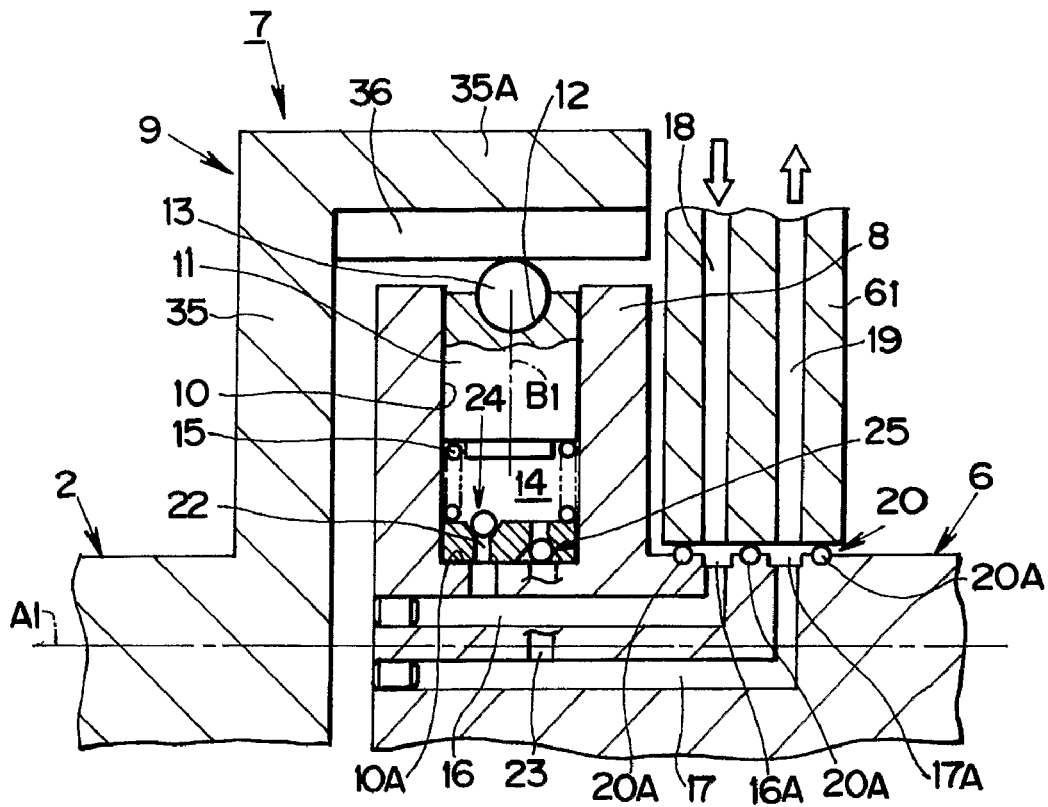
FIG. 2 is a sectional view showing a configuration example of an oil pump shown in FIG. 1.
Figure 3:
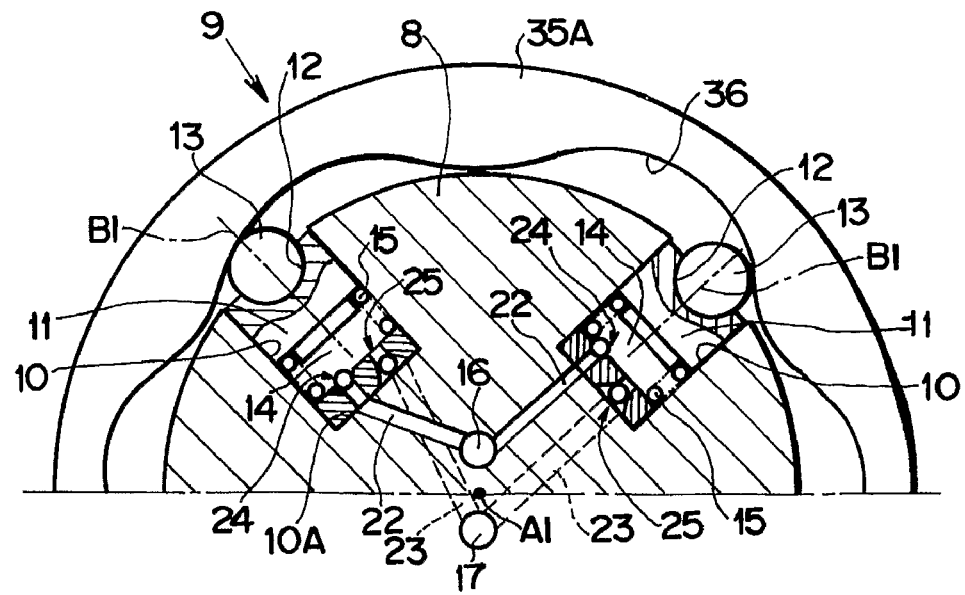
FIG. 3 is a sectional view showing a configuration example of the oil pump shown in FIG. 1.

Moreover, a crankshaft 6 of the engine 1 and the input shaft 2 are arranged on a common rotation axis A1, and an oil pump 7 is arranged on the power transmission route from the crankshaft 6 to the input shaft 2. In this embodiment 1, a radial piston pump is used as the oil pump 7. The configuration of the oil pump 7 will be described with reference to FIGS. 2 and 3. FIG. 2 is a sectional view showing a plane including the rotation axis A1, and FIG. 3 is a sectional view showing a plane perpendicular to the rotation axis A1. This oil pump 7 has an inner race 8 provided to the crankshaft 6 and an outer race 9 provided to the input shaft 2.

The inner race 8 is formed on the end portion of the crankshaft 6 in the input shaft 2 side, and which is shaped around the rotation axis A1 into a disc shape. Moreover, a plurality of cylinders 10 is provided in the inner race 8 along with the circumferential direction. Each cylinder 10 is a generally-cylindrical recess portion opening to the outer circumferential face of the inner face 8. As shown in FIG. 2, axes B1 of each cylinder 10 are generally perpendicular to the rotation axis A1. Moreover, as shown in FIG. 3, the rotation axis A1 is on the point at the intersection of the axes B1 of the pistons 11.

A piston 11, which is capable of reciprocating along with the axis B1, is arranged in each cylinder 10. That is, the piston 11 is movable in the radial direction of the inner race 8. Moreover, a recess (concave) portion 12 is formed on the outer end face of each piston 11. The shape of the recess portion 12 is rounded, and a ball 13 is held therein. The ball 13 is allowed to roll in the recess portion 12. On the other hand, an oil chamber 14 is formed between a deep end face 10A of the cylinder 10 and the piston 11. An elastic member 15 is provided in the oil chamber 14 so that the force to push the piston 11 outwardly in the cylinder 10 is applied to the piston 11 by the elastic member 15. A spring or the like may be used for the elastic member 15.

On the other hand, an oil suction passage 16 and an oil discharging passage 17 are formed in the crankshaft 6 in the direction of the rotation axis. Moreover, two lines of annual grooves 16A and 17A are formed on the outer circumferential face of the crankshaft 6. The annual grooves 16A and 17A are arranged at different positions in the direction of the rotation axis. The oil suction passage 16 is connected with the annual groove 16A, and the oil discharging passage 17 is connected with the annual groove 17A. Additionally, in the casing 60, there is arranged a partition 61 extending in the radial direction around the rotation axis A1, and a shaft hole 20 is formed in the partition 61. This partition 61 is arranged between the engine 1 and the oil pump 7 in the direction of the rotation axis. In the partition 61, there are formed an oil suction passage 18 and an oil discharge passage 19. Moreover, the crankshaft 6 is fitted into the shaft hole 20 of the partition 61 in a rotatable manner. The oil suction passage 18 and the oil discharging passage 19 are opened to the shaft hole 20. The oil suction passage 18 is connected with the annual groove 16A, and the oil discharging passage 19 is connected with the annual groove 17A.

With this construction, therefore, the oil suction passages 16 and 18 are communicated with each other, and the oil discharging passages 17 and 19 are communicated with each other, regardless of whether the crankshaft 6 is rotated or halted. Moreover, there is provided a sealing device 20A for preventing the shaft hole 20 from a leakage of the oil in the oil suction passage 18, the oil discharging passage 19, the annual grooves 16A and 17A. As shown in FIG. 1, furthermore, there is provided an oil pan 21 to which the oil suction passage 18 is connected.

Moreover, there are provided an oil passage 22 for communicating the oil suction passage 16 with the oil chamber 14, and an oil passage 23 for communicating the oil discharging passage 17 with the oil chamber 14. The oil passage 22 is provided with a check valve 24, and the oil passage 23 is provided with a check valve 25. The check valve 24 allows the oil from the oil suction passage 16 to be sucked into the oil chamber 14, and prevents the oil from the oil chamber 14 from flowing back to the oil suction passage 16. On the other hand, the check valve 25 allows the oil from the oil chamber 14 to be discharged to the oil discharging passage 17, and prevents the oil from the oil discharging passage 17 from flowing back to the oil chamber 14.

Figure 4:
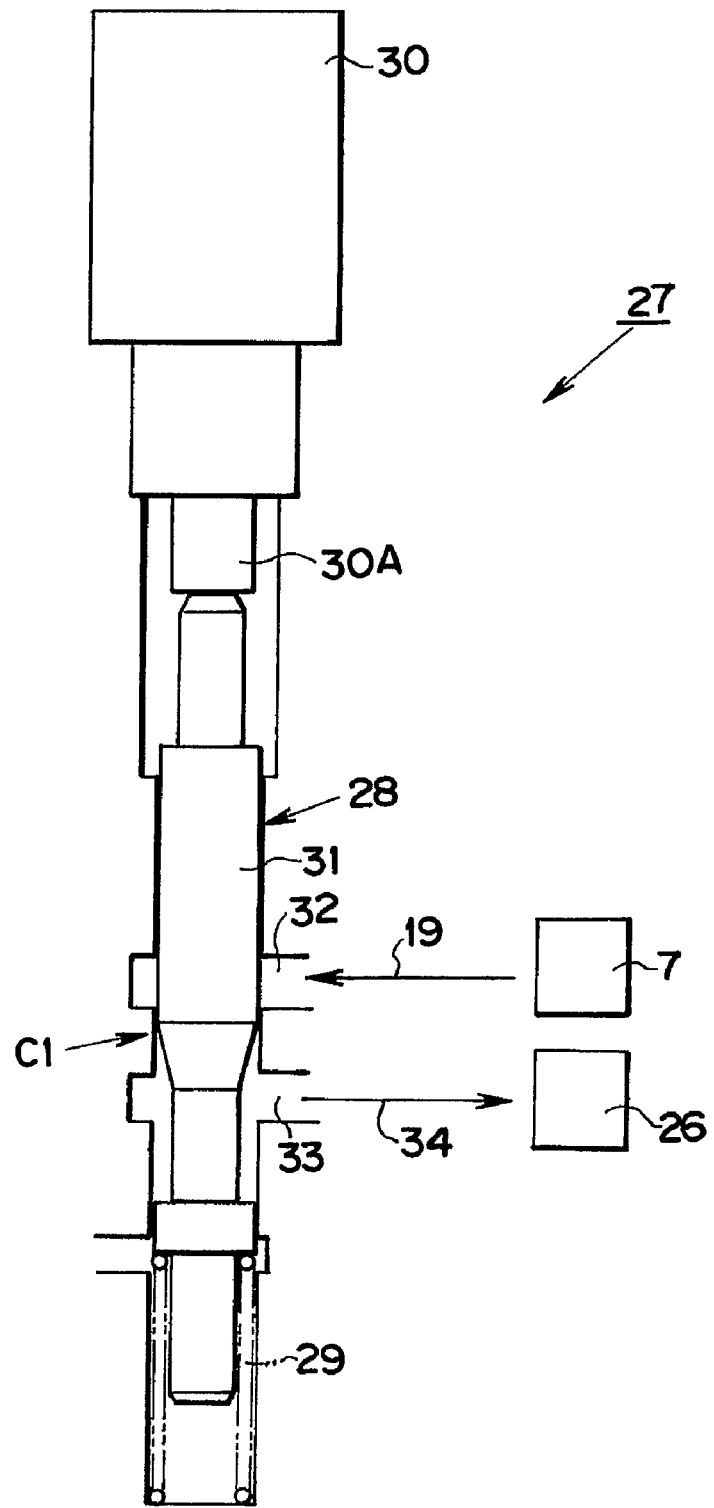
FIG. 4 is a diagram showing a configuration of a control valve shown in FIG. 1.

A control valve 27 is provided to the oil passage for connecting the oil discharging passage 19 and the hydraulic control unit 26. The configuration example of the control valve 27 will be described with reference to FIG. 4. The control valve 27 has a spool 28, an elastic member 29, a solenoid 30 and a plunger 30A. The spool 28 is arranged to reciprocate within a valve body 200 generally linearly. Moreover, the elastic member 29 is a spring for example, and this applies a force to the spool 28 in the upward direction in FIG. 4. Moreover, when the solenoid 30 is energized, a magnetic power to push the plunger 30A downwardly in FIG. 4 is generated. Furthermore, a land 31 is formed in the spool 28, and the control valve 27 has a suction port 32 and a discharging port 33. The suction port 32 is connected to the oil discharging passage 19, and the discharging port 33 is connected to the hydraulic control unit 26 through the oil passage 34. A port C1 is formed between the valve body 200 and the outer circumferential face of the land 31. The action of the spool 28 is controlled in accordance with the corresponding relation between the force applied to the spool 28 by the elastic member 29 and the force applied to the spool 28 by the plunger 30A. The section area of the port C1 is controlled by the action of the spool 28, so that the flow amount of oil to be discharged from the suction port 32 to the discharging port 33 is controlled.

The outer race 9 has an outward flange 35 formed around the input shaft 2, and a cylindrical portion 35A extending to the outer flange 35. The cylindrical portion 35A is arranged to wrap around the inner race 8, and a cam face 36 is formed on the inner circumference of the cylindrical portion 35A. This cam face 36 is generally wavy and formed annularly around the rotation axis A1. That is, a curved protrusion protruding outwardly in the radial direction, and a curved recess recessing inwardly in the radial direction, are arranged alternately and continuously in the circumferential direction. The cam face 36 and the ball 13 equipped to the inner race 8 are contacted with each other. The ball 13 is capable of rolling along with the cam face 36.

The engine 1 is a well-known power unit for converting thermal energy resulting from the fuel combustion into kinetic energy, comprising: an air intake system, an exhaust system, a fuel injection system and so on. Specifically, the engine 1 can be exemplified by e.g., an internal combustion engine, a gasoline engine, a diesel engine and a LPG engine etc.

In FIG. 1, a forward/backward switching mechanism 37 is arranged on the route from the input shaft 2 to the belt type continuously variable transmission 3. A transmission TM is composed of these forward/backward switching mechanism 37 and the belt type continuously variable transmission 3. The forward/backward switching mechanism 37 is a mechanism adopted due to the fact that the rotation of the engine 1 is restricted in one direction, therefore, it has a function to switch the rotating direction of a primary shaft 38 with respect to that of the input shaft 2. In the example shown in FIG. 1, the forward/backward switching mechanism 37 has a double-pinion type planetary gear mechanism PR. That is, the planetary gear mechanism PR comprises: a sun gear 39 rotating integrally with the input shaft 2; a ring gear 40 arranged concentrically with the sun gear 39; a pinion gear 41 meshing with the sun gear 39; another pinion gear 42 meshing with the pinion gear 41 and the ring gear 40; and a carrier 43 holding the pinion gears 41 and 42 to rotate thereon and to revolve around the carrier 43. The carrier 43 and the primary shaft 38 are connected with each other so as to rotate integrally.

Moreover, the forward/backward switching mechanism 37 has a forward clutch 44 and a backward brake 45. The forward clutch 44 connects and disconnects the input shaft 2 and the carrier 43 selectively. On the other hand, the backward brake 45 reverses the rotating direction of the primary shaft 38 with respect to that of the input shaft 2, by selectively fixing the ring gear 40. The hydraulic control unit 26 controls the oil pressure of the operating oil to be fed to hydraulic chambers 44A and 45A for controlling engagement/release of the forward clutch 44 and the backward brake 45.

The belt type continuously variable transmission 3 has a primary pulley 46 and a secondary pulley 47 arranged in parallel with each other. A belt 48 is applied to the primary pulley 46 and the secondary pulley 47. Moreover, there are provided a hydraulic servo mechanism 49 for controlling a clamping pressure to be applied from the primary pulley 46 to the belt 48, and a hydraulic servo mechanism 50 for controlling a clamping pressure to be applied from the secondary pulley 47 to the belt 48. The hydraulic control unit 26 is constructed to control the oil pressure and the feeding amount of the operating oil to be fed to the hydraulic chambers 49A and 50A of the hydraulic servo mechanisms 49 and 50. In addition, lubricating oil is fed from the hydraulic control unit 26 to a lubrication line 300.

The primary pulley 46 rotates integrally with the primary shaft 38, and the secondary pulley 47 rotates integrally with a secondary shaft 51. The primary shaft 38 and the secondary shaft 51 are arranged in parallel with each other, and the torque of the secondary shaft 51 is transmitted to the wheel 5 through a transmission mechanism 52 and the differential 4.

Next, the control line of the Vehicle Ve shown in FIG. 1 will be described hereafter. There is provided an electronic control unit 53 functions as a controller for controlling the vehicle Ve entirely. This electronic control unit 53 is composed mainly of a microcomputer having a processing unit (e.g., CPU or MPU), memory units (e.g., RAM and ROM) and an input/output interface. To this electronic control unit 53, there are inputted the command signals of an accelerator demand, a braking demand, an engine speed (an engine rotation speed), a throttle opening, a speed (a rotation speed) of the input shaft 2, a speed (a rotation speed) of the primary shaft 38, a speed (a rotation speed) of the secondary shaft 51, a shift position selected by a driver of the vehicle Ve, and so on. From the electronic control unit 53, on the other hand, there are outputted a command signal for controlling the hydraulic control unit 26, a command signal for controlling the control valve 27, a command signal for controlling the engine 1, and so on.

When the engine 1 is operated, the torque of the crankshaft 6 is transmitted to the input shaft 2 through the oil pump 7. The principle of torque transmission through the oil pump 7 will be described later. In case a forward position is selected as the shift position, the forward clutch 44 is engaged and the backward brake is released in the forward/backward switching mechanism 37. As a result, the input shaft 2 and the carrier 43 are connected with each other to rotate integrally, and the torque of the input shaft 2 is thereby transmitted to the primary shaft 38. In this case, the input shaft 2 and the primary shaft 38 rotate in the same direction. On the other hand, in case the reverse position is selected as the shift position, the reverse brake 45 is engaged and the forward clutch 44 is released. As a result, the ring gear 40 is halted to act as a reaction element, and the torque of the input shaft 2 is thereby transmitted to the primary shaft 38. In this case, the primary shaft 38 rotates in the opposite direction of the input shaft 2.

In the belt type continuously variable transmission 3, on the other hand, the feeding conditions of the operating oil in the hydraulic servo mechanisms 49 and 50 are controlled by the hydraulic control unit 26. Specifically, the flowing amount of operating oil to be fed to the hydraulic servo mechanism 49 is controlled to control the running radius of the belt 48 on the primary pulley 46 and the running radius of the belt 48 on the secondary pulley 47. As a result, it is possible to steplessly control (continuously) the speed change ratio of the belt type continuously variable transmission 3, i.e., the ratio between the rotation speeds of the primary shaft 38 and the secondary shaft 51. In addition to this speed change control, the clamping pressure from the secondary puller 47 to the belt 48 is so regulated as to control the torque capacity of the belt type continuously variable transmission 3.

A required driving force for the vehicle is determined on the basis of, e.g., the vehicle speed and the accelerator demand (e.g., the accelerator opening), and a target engine speed and a target engine torque are obtained on the basis of the determination result. Specifically, a target engine output is determined in accordance with the required driving force; the target engine speed to achieve the target engine output at the optimum fuel consumption is determined; and the target engine torque is determined in accordance with the target engine speed. Then, the speed change ratio of the belt type continuously variable transmission 3 is controlled so that the actual engine speed may approach the target engine speed. Thus, the torque of the input shaft 2 is transmitted to the transmission mechanism 52 through the forward/backward switching mechanism 37 and the belt type continuously variable transmission 3, and the torque of the transmission mechanism 52 is transmitted to the wheel 5 through the differential 4.

Here will be described the principle of torque transmission between the input shaft 2 and the crankshaft 6 and the control method of torque. In other words, the principle of the torque transmission utilizing the oil pump 7, and the control method of the transmission torque utilizing the oil pump 7 will be described, as well as a control of the oil discharge amount of the oil pump 7. When the engine 1 is operated, a torque is generated in the direction of rotating the inner race 8 clockwise in FIG. 3. In this embodiment, the capacity of the torque transmitted between the crankshaft 6 and the input shaft 2, and the oil discharge amount of the oil pump 7 are controlled as follows. First, the ball 13 placed on to the inner race 8 is pushed outwardly in the cylinder 10 by the elastic force of the elastic member 15. When the inner race 8 is rotated, the ball 13 rolls along with the cam face 36 of the outer race 9, and the ball 13 and the piston 11 reciprocate in the direction of the axis B1 within the cylinder 10 according to the radial unevenness of the cam face 36.

The capacity of the oil chamber 14 is changed as a result of the reciprocation of the piston 11 in the cylinder 10. That is, the capacity of the oil chamber 14 is enlarged in case the piston 11 moves outwardly along with the axis B1. On the contrary, the capacity of oil chamber 14 is reduced in case the piston 11 moves inwardly along with the axis B1. When the capacity of oil chamber 14 is enlarged, the pressure in the oil chamber 14 becomes negative. Then, the check valve 24 is opened and the oil in the oil pan 21 is sucked into the oil chamber 14 through the oil suction passages 18 and 16. Since the check valve 25 is closed in this case, the oil of the oil discharging passage 17 will not flow back to the oil chamber 14.

Subsequently, when the piston 11 moves inwardly as a result of the relative rotation between the inner race 8 and the outer race 9, the capacity of the oil chamber 14 is reduced and the oil pressure therein is raised. Then, in case the oil pressure of the oil chamber 14 becomes higher than that of the oil suction passage 16, the check valve 24 is closed. As a result, the oil in the oil suction passage 16 is not sucked into the oil chamber 14, and the oil in the oil chamber 14 is prevented from flowing back to the oil suction passage 16. On the other hand, in case the capacity of the oil chamber 14 is reduced and consequently the oil pressure therein becomes higher than that in the oil discharging passage 17, the check valve 25 is opened. As a result of this, the oil in the oil chamber 14 is fed to the control valve 27 through the oil discharging passage 17 and the oil discharging passage 19. After this, suction and discharge of the oil in the oil pump 7 is carried out by the repetition of reciprocation of the piston 11.

In the control valve 27, on the other hand, the section area of the port C1 formed between the suction port 32 and the discharging port 33 is controlled, so that the amount of oil discharged from the oil pump 7 is controlled. Specifically, the amount of the oil fed from the oil pump 7 to the hydraulic control unit 26 is controlled in accordance with the section area of the port C1.

In this embodiment, the action of the spool 28 is controlled on the basis of the current value of electric power supplied to the solenoid 30, so as to adjust the section area of the port C1. The flow resistance of the oil discharged from the oil discharging passage 19 to the oil passage 34 is changed in accordance with the section area of the port C1. Specifically, the larger the section area of the port C1 is made, the more the flow resistance of oil is reduced. Also, the smaller the section area of the port C1 is made, the more the flow resistance of oil is increased.

The flow resistance of the oil discharged from the oil discharging passage 19 to the oil passage 34 affects the operating characteristics of the piston 11 in the cylinder 10. That is, in case the force to push the piston 11 inwardly is constant, and the piston 11 is moved inwardly so that the capacity of the oil chamber 14 is reduced, the higher the flow resistance of the oil discharged from the oil discharging passage 19 to the oil passage 34 is, the more the amount of the oil discharged from the oil chamber 14 to the oil discharging passage 17 per unit of time period decreases. The lower the flow resistance of the oil discharged from the oil discharging passage 19 to the oil passage 34 is, on the other hand, the more the amount of oil discharged from the oil chamber 14 to the oil discharging passage 17 per unit of time increases.

Moreover, the higher the flow resistance of the oil discharged from the oil discharging passage 19 to the oil passage 34 is, the more the oil pressure in the oil chamber 14 is difficult to drop. Therefore, the load necessary to move the piston 11 inwardly is increased. On the other hand, the lower the flow resistance of the oil discharged from the oil discharging passage 19 to the oil passage 34 is, the easier the oil pressure in the oil chamber 14 to drop. Therefore, the load necessary to move the piston 11 inwardly is decreased. In this embodiment 1, as a result of the relative rotation between the inner race 8 and the outer race 9, the ball 13 rolls along with the cam face 36 and moves in the radial direction of the inner race 8. Consequently, the load to push the piston 11 inwardly is generated. Therefore, the higher the load necessary to move the piston 11 inwardly is, the higher the load in the circumferential direction necessary to rotate the inner race 8 and the outer race 9 relatively becomes. In other words, the torque capacity increases in the oil pump 7. That is, the oil pump 7 functions also as a torque limiter for controlling the torque capacity between the crankshaft 6 and the input shaft 2. Thus, the load of the engine 1 to generate the power for driving the oil pump 7 is changed in accordance with the flow resistance of the oil discharged from the oil discharging passage 19 to the oil passage 34. Here, in case the torque capacity of the oil pump 7 is increased, the engine load is increased. Therefore, the speed difference between the crankshaft 6 and the input shaft 2 becomes wider. On the other hand, in case the torque capacity of the oil pump 7 is decreased, the engine load is reduced. Therefore, the speed difference between the crankshaft 6 and the input shaft 2 becomes smaller.

According to the configurations shown in FIGS. 1 to 4, as has been described above, it is possible to control the capacity of the torque transmitted between the crankshaft 6 and the input shaft 2 by controlling the oil discharge amount of the oil pump 7 by the control valve 27. Specifically, the oil pump 7 has both functions, such as a function to feed the oil to the hydraulic control unit 26, and a function as a clutch (or a function as a starting device) for controlling the torque capacity between the crankshaft 6 and the input shaft 2. In short, a single equipment comprises a plurality of functions. This contributes to reduce the number of constituent parts of the power transmission system, and to downsize the power transmission system itself. For this reason, a mountability of the power transmission system is improved.

Moreover, the reaction force of the case in which the inner race 8 of the oil pump 7 rotates to discharge the oil is received by the input shaft 2. Therefore, the torque transmitted to the input shaft 2 can be increased as much as possible, and the torque of the case in which the vehicle Ve is started to run can be increased. Moreover, since the oil structurally circulates the oil passage in the oil pump 7 functioning as the clutch, the oil pump 7 is much excellent in the heat resistance in comparison with the clutch utilizing a friction material. Therefore, it is not necessary to execute the control for lowering the engine output even at a high-load operating time of the engine 1.

The configuration shown in FIGS. 1 to 4 may also be applied to the vehicle in which the crankshaft 6 is equipped with a flywheel, or the vehicle in which a damper is provided on the route from the crankshaft 6 to the inner race 8 of the oil pump 7.

Here will be described the corresponding relations between the configurations shown in FIGS. 1 to 4 and the configuration of the invention. The crankshaft 6 corresponds to an input member of the invention. That is, the crankshaft 6 of the engine 1 functions also as the input member of the oil pump 7. Moreover, the input shaft 2 functions also as an output member and an input member of the invention. The inner race 8 corresponds to a first rotary member of the invention; the outer race 9 corresponds to a second rotary member of the invention; and the ball 13 and the piston 11 correspond to a transmitting member of the invention. The "Power transmitting state" in the invention includes: the torque transmitted between the crankshaft 6 and the input shaft 2; the capacity of the torque transmitted between the crankshaft 6 and the input shaft 2; the speed difference between the crankshaft 6 and the input shaft 2, and so on. In the invention, moreover, the "input member" means a member arranged ahead of the output member in the transmitting direction of the power outputted from the prime mover. On the other hand, "the output member" means a member arranged behind the input member in the transmitting direction of the power outputted from the prime mover.

Moreover, the hydraulic chamber 44A, 45A, 49A and 50A, the power transmission line, e.g., the lubrication line 300 for feeding lubricating oil to the belt type continuously variable transmission 3 and the forward/backward switching mechanism 37 and so on correspond to an oil requiring portion of the invention. Moreover, the electronic control unit 53 corresponds to a control means of the invention; the internal combustion engine, more specifically, the engine 1 corresponds to the prime mover of the invention; the transmission TM corresponds to a transmission of the invention; and the belt type continuously variable transmission 3 corresponds to the continuously variable transmission of the invention; the oil discharging passage 19 corresponds to an oil discharging passage of the invention; the control valve 27 corresponds to the control valve of the invention; and the port C1 corresponds to a port of the invention.

A practicable control example will be described on the premise of the configuration described in the embodiment 1. Specifically, here will be described control examples 1 to 3, which are practicable in case of controlling the discharge amount of the oil pump 7, or in case of controlling the torque transmitted between the crankshaft 6 and the input shaft 2.

CONTROL EXAMPLE 1

First, the control example 1 will be described with reference to a flowchart shown in FIG. 5. As has been described above, in case the oil discharge amount of the oil pump 7 is controlled to increase the capacity of the torque transmitted between the crankshaft 6 and the input shaft 2, the engine load is changed (increased) so that the engine speed may be changed (lowered). For this reason, the control example 1 controls the oil discharge amount of the oil pump 7 and the torque capacity of the oil pump 7, in accordance with the torque transmitted from the engine 1 and the input shaft 2.

Prior to carrying out the control example 1, a relation between the target engine speed and the target engine torque are mapped unambiguously in accordance with the throttle opening, and stored in the electronic control unit 53. In this case, the technical significance of the target engine speed is different from that of a target engine speed used for controlling the speed change ratio of the belt type continuously variable transmission 3, and it is the target engine speed to be achieved by controlling the oil pump 7. More specifically, the target engine speed of this case is the target engine speed considering the relation between the torque to be transmitted between the crankshaft 6 and the input shaft 2, and the actual torque capacity between the crankshaft 6 and the input shaft 2. At the predetermined throttle opening and with the predetermined engine torque, it is judged (at Step S1) whether or not an actual engine speed (or an actual Ne) corresponds to the target engine speed (or the target Ne). In case the answer of Step S1 is NO, it is judged (at Step S2) whether or not the actual engine speed exceeds the target engine speed.

If the answer of Step S2 is YES, the torque capacity in the oil pump 7 may be too small to transmit the target torque from the crankshaft 6 to the input shaft 2 so that the engine speed may have been increased. For this reason, in case the answer of Step S2 is YES, the control for reducing the section area of the port C1 of the control valve 27 is executed to reduce the oil discharge amount of the oil pump 7 (at Step S3), and the routine is returned to Step S1. That is, at Step S3, the control for increasing the magnetic attractive power generated by supplying current power to the solenoid 30 is executed. Then, the force for operating the spool 28 downwardly in FIG. 4 is increased, and the section area of the port C1 is reduced.

As a result, the amount of the oil discharged from the oil chamber 14 of the oil pump 7 is reduced so that the drop in the oil pressure is suppressed in the oil chamber 14. Therefore, the required force to push the piston 11 inwardly is increased, and the torque capacity is increased in the oil pump 7. Thus, the speed rise of the engine is suppressed by the process of Step S3 so that the actual engine speed may approach the target engine torque.

On the contrary, in case the answer of Step S2 is NO, the torque capacity of the oil pump 7 is too large to transmit the target torque between the crankshaft 6 and the input shaft 2, so that the engine load may be increased. Accordingly, in case the answer of Step S2 is NO, the control for enlarging the section area of the port C1 of the control valve 27 is executed to increase the oil discharge amount of the oil pump 7 (at Step S4), and the routine is returned to Step S1. That is, the control for weakening the magnetic attractive power generated by energizing the solenoid 30 is executed at Step S4. Consequently, the force for operating the spool 28 upward in FIG. 4 is increased so that the section area of the port C1 is enlarged.

As a result, the amount of the oil discharged from the oil chamber 14 of the oil pump 7 is increased so that the rise in the oil pressure is suppressed in the oil chamber 14. Therefore, the force required to push the piston 11 inwardly is decreased, and the torque capacity is reduced in the oil pump 7. Thus, the drop in the engine speed is suppressed by the process of Step S4, so that the actual engine speed may approach the target engine torque. Here, in case the answer of Step S1 is YES, the routine shown in FIG. 5 is ended.

Figure 5:
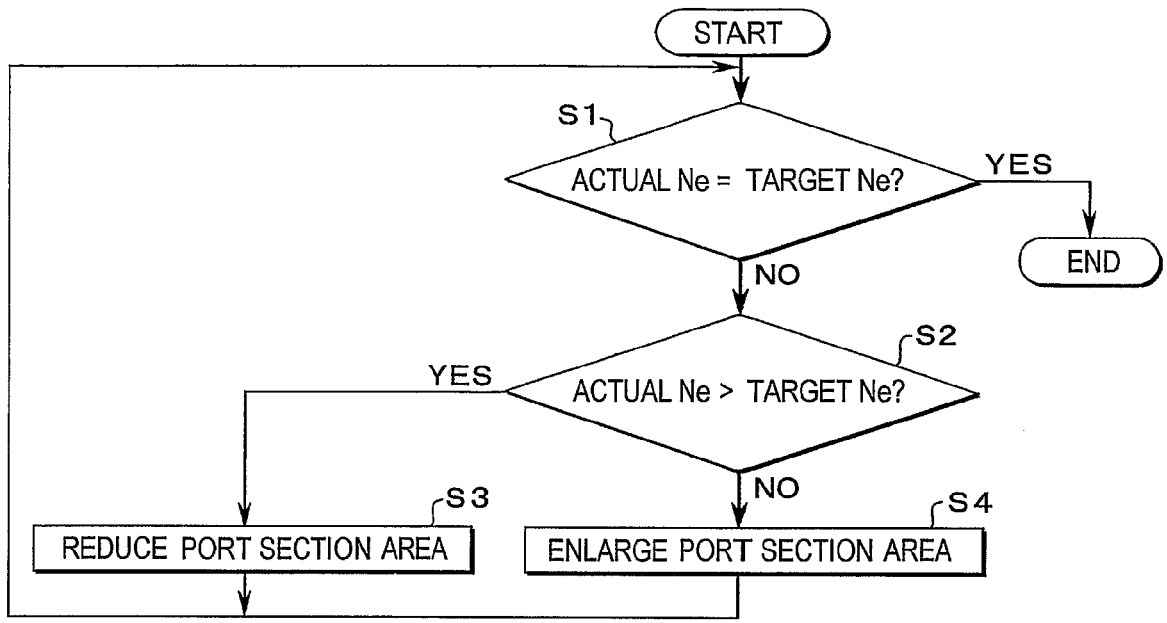
FIG. 5 is a flowchart showing a control example 1 practicable in the vehicle illustrated in FIG. 1.

According to the control example of FIG. 5, moreover, the torque capacity of the oil pump 7 can be controlled on the basis of the target engine speed, target engine torque and so on. According to the control example of FIG. 5, furthermore, the torque capacity of the oil pump 7 can be controlled in accordance with the torque to be transmitted.

Here will be described the corresponding relations between the functional means shown in FIG. 5 and the configuration of the invention. The oil discharge amount of the oil pump 7, the section area of the port C1, the flow resistance of oil and so on correspond to the "discharge condition of the oil pump" of the invention. The throttle opening, the target engine speed, the target engine torque, the torque to be transmitted and so on correspond to the "operating state of the vehicle" of the invention.

CONTROL EXAMPLE 2

Figure 6:
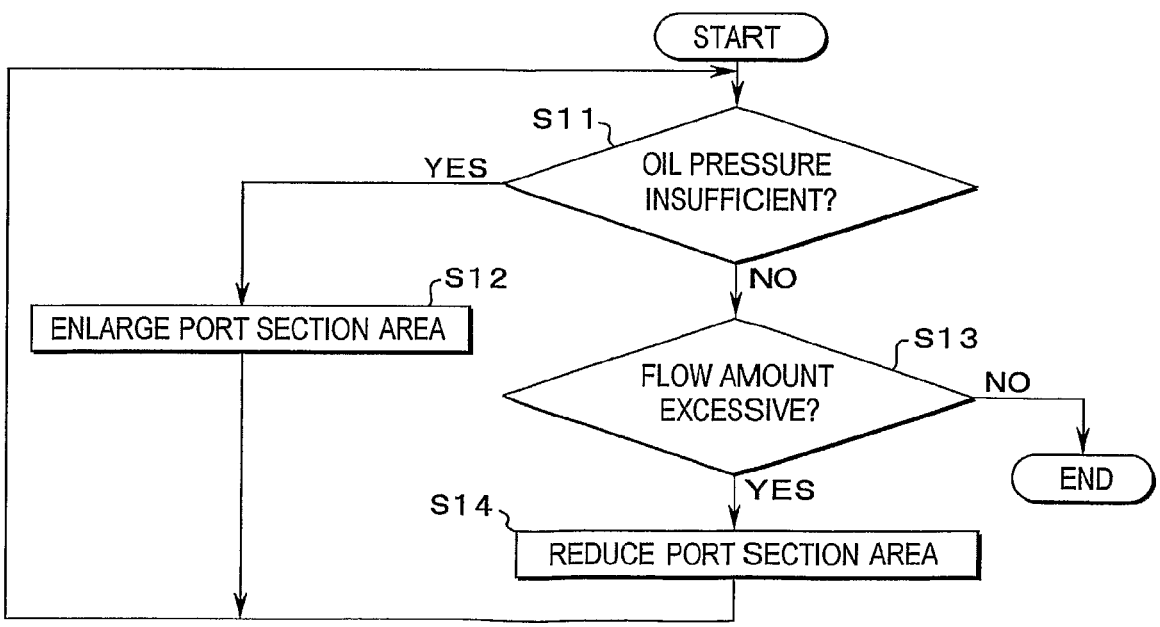
FIG. 6 is a flowchart showing a control example 2 practicable in the vehicle illustrated in FIG. 1.

Next, here will be described another control example of the oil discharge amount of the oil pump 7 described in the control example 1, with reference to the flowchart of FIG. 6. At first, it is judged (at Step S11) whether or not a required oil pressure is insufficient at the oil requiring portion where the oil is fed from the oil pump 7. The oil requiring portion can be exemplified by, e.g., the hydraulic servo mechanisms 49 and 50 of the belt type continuously variable transmission 3. Specifically, the speed change ratio of the belt type continuously variable transmission 3 may be changed abruptly by increasing the feeding amount of the oil to the hydraulic servo mechanism 49 abruptly. Otherwise, the torque capacity of the belt type continuously variable transmission 3 may be increased abruptly by raising the oil pressure in the hydraulic chamber of the hydraulic servo mechanism 50 abruptly.

In case the flow amount of the operating oil is insufficient when executing the control, the answer of Step S11 is YES. Then, the control for enlarging the section area of port C1 of the control valve 27 is executed (at Step S12), and the routine is returned to Step S11. The specific control at Step S11 is identical to that carried out at Step S4. When the control at Step S11 is executed, the flow amount of the oil discharged from the oil pump 7 is increased on the aforementioned principle. Consequently, the shortage in the flow amount of the operating oil fed to the hydraulic servo mechanism 49 through the hydraulic control unit 26, and the shortage in the oil pressure in the hydraulic servo mechanism 50 are resolved. Therefore, the delay in the control response is suppressed in the belt type continuously variable transmission 3 so that the drivability can be improved.

In case the answer of Step S11 is NO, on the other hand, it is judged (at Step S13) whether or not the discharge amount of the oil is excessive in the oil pump 7. The relation between the oil pressure required by the aforementioned oil requiring portion and the minimum value of the discharge amount of the oil corresponding to the required oil pressure is mapped in advance. Therefore, in case the actual discharge amount of the oil of the oil pump 7 exceeds the minimum value of the discharge amount of the oil for example, the answer of Step S13 is YES and the control for reducing the section area of the port C1 of the control valve 27 is executed (at Step S14). Then, the routine is returned to Step S11. In case the control of Step S14 is executed, the flow amount of the oil discharged from the oil pump 7 is reduced on the same principle as describe above. Therefore, the excess of discharge amount of the oil in the oil pump 7 as well as the deterioration in fuel consumption of engine 1 can be suppressed. Here, in case the answer of Step S13 is NO, the routine shown in FIG. 6 is ended. In addition, the processes subsequent to Steps S12 and S13 can be executed on the basis of the result of the judgment of whether or not the oil pressure is insufficient in the hydraulic chambers 44A and 45A, and whether or not the oil pressure is insufficient in the power transmission line, e.g., in the lubrication line for feeding the lubricating oil to the belt type continuously variable transmission 3 and the forward/backward switching mechanism 37, at Step S11.

CONTROL EXAMPLE 3

Figure 7:
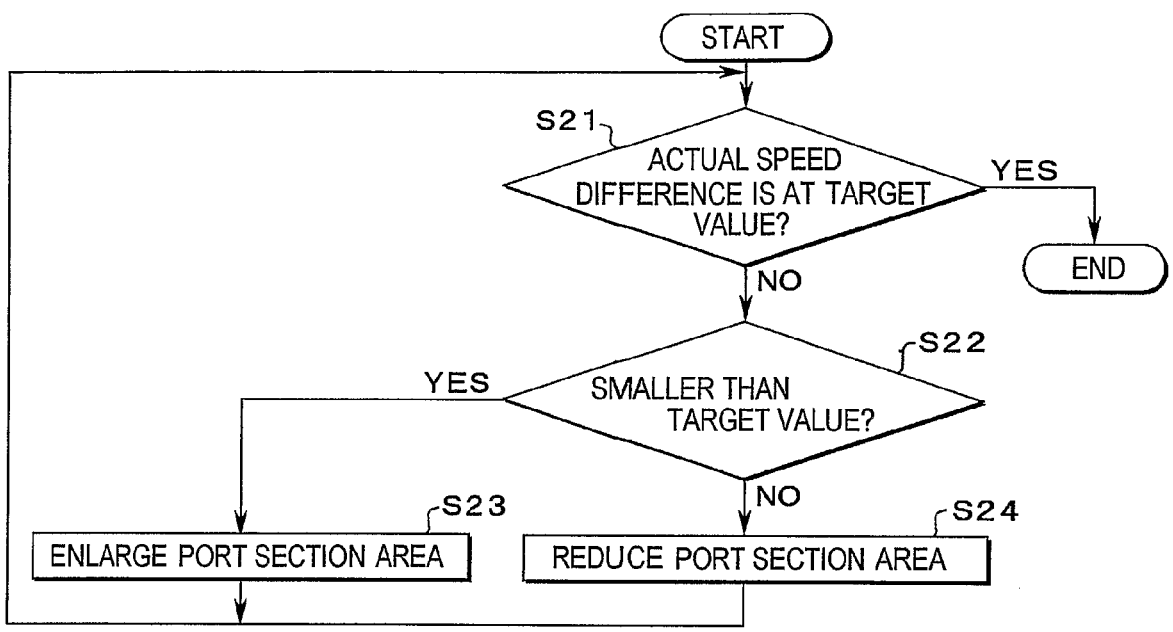
FIG. 7 is a flowchart showing a control example 3 practicable in the vehicle illustrated in FIG. 1.

Here will be described another control example of the oil discharge amount of the oil pump 7 described in the control example 1, with reference to the flowchart of FIG. 7. The engine 1 is the apparatus for converting thermal energy generated by burning fuel into kinetic energy; therefore, the fluctuation in torque is inevitable. Specifically, the fluctuation in the engine torque tends to widen in case the engine speed drops. In case the engine speed is constant, on the other hand, the fluctuation of the engine torque tends to widen in accordance with the widening of the throttle opening. This fluctuation of the engine torque causes vibration and noise as it is transmitted to the power transmission route.

The control example 3 is an example to operate the oil pump 7 as a damper, in order to reduce vibration and noise arising from the fluctuation of the engine torque. At first, it is judged (at Step S21) whether or not the speed difference between the inner race 8 and the outer race 9 constructing the oil pump 7 is at a predetermined value. Here, definition of the "predetermined value" is a speed difference at which the fluctuation range in the torque transmitted from the engine 1 to the input shaft 2 can be suppressed narrower than the predetermined range, and at which the torque capacity corresponding to the torque to be transmitted can be secured.

First of all, here will be described absorption or damping of the torque fluctuation. In order to execute the judgment at Step S21, a target value of the speed difference between a parameter of the engine and a parameter of the throttle opening is mapped and stored in the electronic control unit 53. Specifically, the higher the engine speed is, the smaller the target value of the speed difference is set. In case the engine speed is constant, on the other hand, the narrower the throttle opening is, the smaller the target value of the speed difference is set.

The reason for setting the target value of the speed difference with above-described characteristics is to be described hereafter. As has been described above, the torque capacity between the crankshaft 6 and the input shaft 2 can be controlled by controlling the oil discharge amount of the oil pump 7, and in case the engine torque fluctuates wider than the predetermined range, the torque fluctuation can be absorbed or damped by widening the speed difference between the inner race 8 and the outer race 9. For this reason, the more the torque capacity between the crankshaft 6 and the input shaft 2 is reduced, the more the function as the damper for absorbing or damping the torque fluctuation is improved.

Meanwhile, the oil pump 7 has a function to transmit the engine torque to the input shaft 2, so that it has to secure the torque capacity corresponding to the target torque to be transmitted to the input shaft 2. For that purpose, it is also necessary to set the upper limit value of the speed difference. Here, the target value of the speed difference determined at Step S21 is a value of a predetermined range including the upper and lower limit values.

In case the answer of Step S21 is NO, it is judged (at Step S22) whether or not an actual speed difference is smaller than the target value of the speed difference. In case the oil pump 7 does not function as the damper sufficiently, for example, the answer of Step S22 is YES, and the control for enlarging the section area of the port C1 of the control valve 27 is executed (at Step S23). Then, the routine is returned to Step S21. In case the control at Step S23 is executed, the torque capacity between the crankshaft 6 and the input shaft 2 is reduced on the aforementioned principle, so that the vibration of the engine torque is difficult to be transmitted to the input shaft 2. Therefore, the vibration and the noise can be suppressed in the transmission route from the input shaft 2 to the wheel 5.

In case the answer of Step S22 is NO, on the other hand, the torque capacity between the crankshaft 6 and the input shaft 2 is too low to transmit the target torque, therefore, the driving force may be insufficient. Accordingly, in case the answer of Step S22 is NO, the control for reducing the section area of the port C1 of the control valve 27 is executed (at Step S24), and then the routine is returned to Step S21. In case the control at Step S24 is executed, the torque capacity between the crankshaft 6 and the input shaft 2 is increased on the aforementioned principle, so that the shortage of the driving force can be suppressed. In case the answer of Step S21 is YES, the routine shown in FIG. 7 is ended.

According to this control example 3, since the oil pump 7 also has the function as the dumper, it is unnecessary to arrange a dedicated dumper on the route from the engine 1 to the wheel 5 so as to suppress vibration and noise. Otherwise, it is possible to simplify the structure of the dedicated damper.

Embodiment 2

Figure 8:
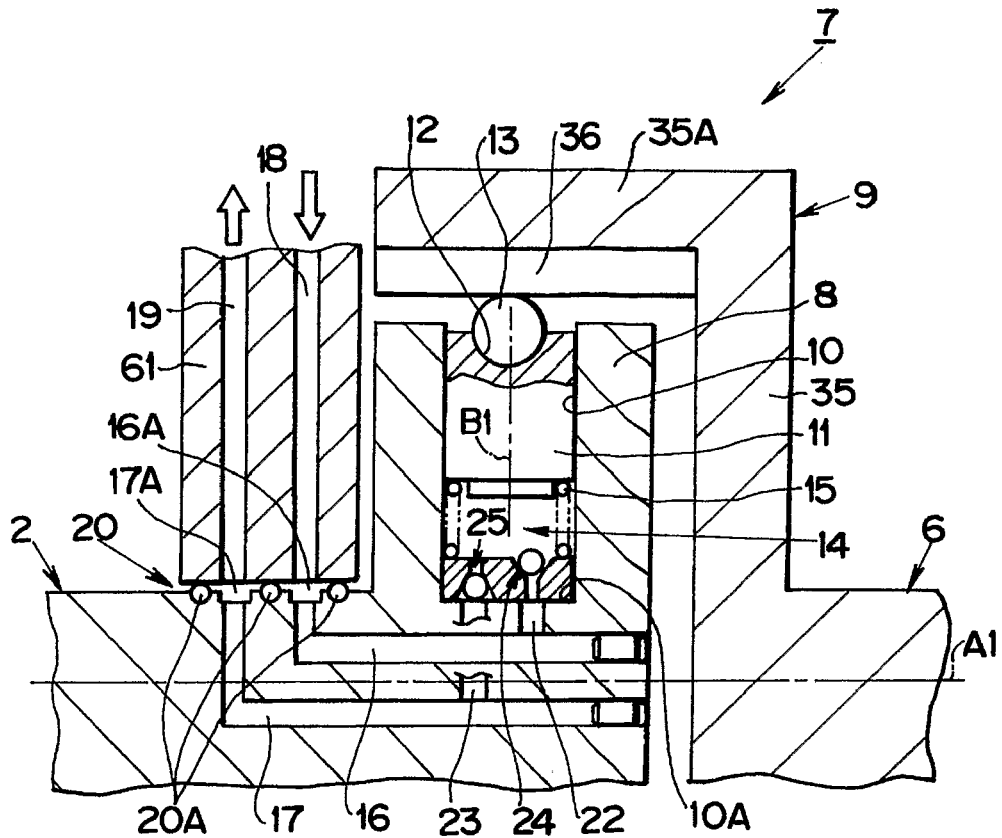
FIG. 8 is a sectional view showing another configuration example of the oil pump according to the invention.

Next, another configuration example of the oil pump 7 shown in FIG. 1 will be described with reference to FIG. 8. In this embodiment 2, the inner race 8 and the outer race 9 are arranged at different positions as compared to the embodiment 1. According to the oil pump 7 of the embodiment 2, the outer race 9 is formed around the crankshaft 6. The outer flange 35, the cylindrical portion 35A and the cam face 36 are formed in the outer race 9. On the other hand, the inner race 8 is formed around the input shaft 2. The cylinder 10, the piston 11, the ball 13, the elastic member 15, the check valves 24 and 25, the oil passages 22 and 23, the oil suction passage 16, the oil discharging passage 17, the sealing device 20A or the like are provided in the input shaft 2. Moreover, the partition 61 is provided between the forward/backward switching mechanism 37 and the oil pump 7 in the direction of the rotation axis, and the oil suction passage 18 and the oil discharging passage 19 are formed in the partition 61. In the configuration of FIG. 8, the inertia moment of the outer race 9 rotating around the axis A1 is greater than that of the inner race 8. Remaining configuration of FIG. 8 is similar to that of FIGS. 1 to 4. In the embodiment of FIG. 8, in case the engine torque is transmitted to the crankshaft 6, the torque is transmitted from the outer race 9 to the inner race 8. The effect achieved by the configurations of FIGS. 1 to 4 can also attained by the oil pump 7 shown in FIG. 8, and the inertia moment of the outer race 9 rotating around the axis A1 is greater than that of the inner race 8. Therefore, flywheel effect of the crankshaft 6 is improved. The control examples 1 to 3 are also practicable in the configuration example of FIG. 8. Here will be described the corresponding relations between the configuration shown in FIG. 8 and the configuration of the invention. The outer race 9 corresponds to the first rotary member of the invention, and the inner race 8 corresponds to the second rotary member of the invention. The corresponding relation between remaining configuration of FIG. 8 and the configuration of the invention is identical to that between the configuration shown in FIGS. 1 to 4 and the configuration of the invention.

In the aforementioned embodiments 1 and 2, there is described the vehicle, in which the transmission TM comprises the belt type continuously variable transmission 3 and the forward/backward switching mechanism 37. However, the present invention is also applicable to a power transmission system for a vehicle comprising a discontinuous transmission, i.e., a transmission capable of changing the speed change ratio stepwise (i.e., discontinuously), as the transmission TM. Moreover, the invention is also applicable to a power transmission system for a vehicle comprising a toroidal type continuously variable transmission as the continuously variable transmission.

Embodiment 3

Next, another embodiment of the power transmission according to the invention will be described hereinafter. In the embodiment 3, a plurality of the inner races 8 of the oil pump 7 is provided. This is the point different from the embodiments 1 and 2. Configuration examples 1 and 2 included in this embodiment 3 will be described in due course.

CONFIGURATION EXAMPLE 1

Figure 9:
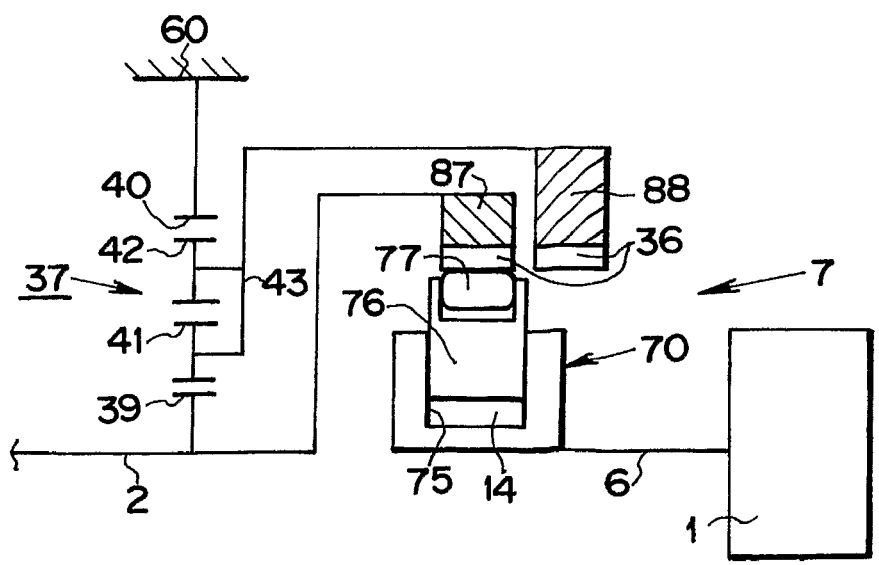
FIG. 9 is a conceptional view showing another configuration example of the oil pump according to the invention.
Figure 10:
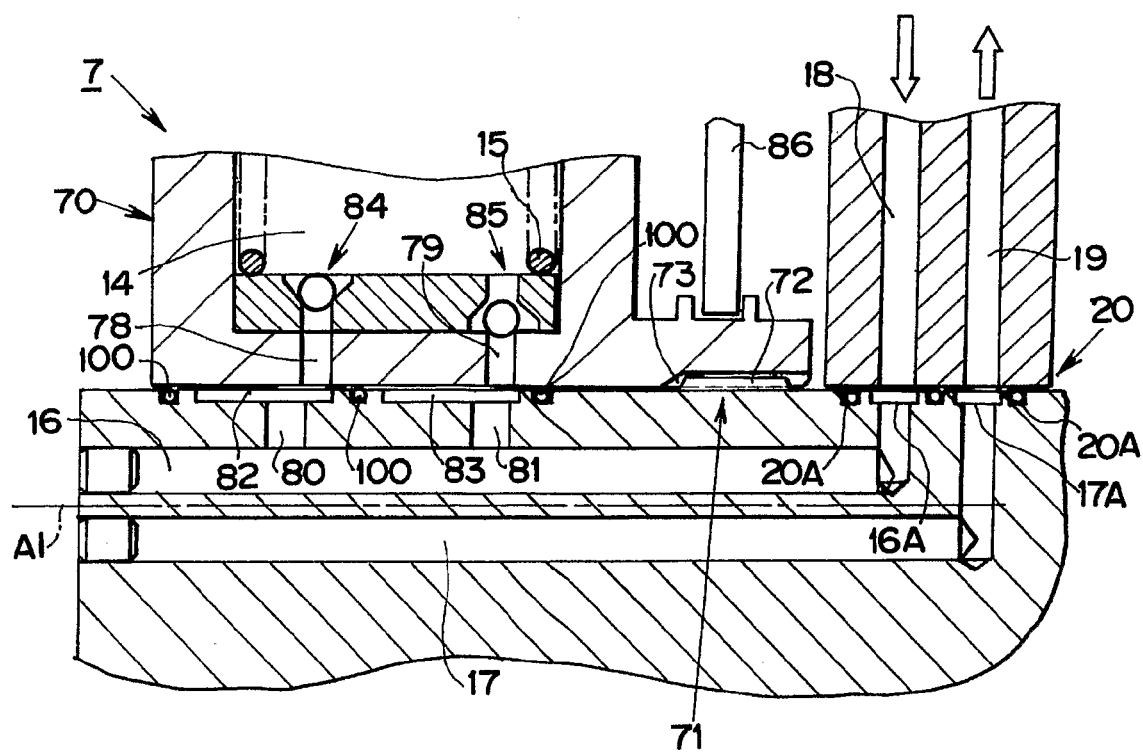
FIG. 10 is a sectional view showing a configuration of the oil pump shown in FIG. 9.
Figure 11:
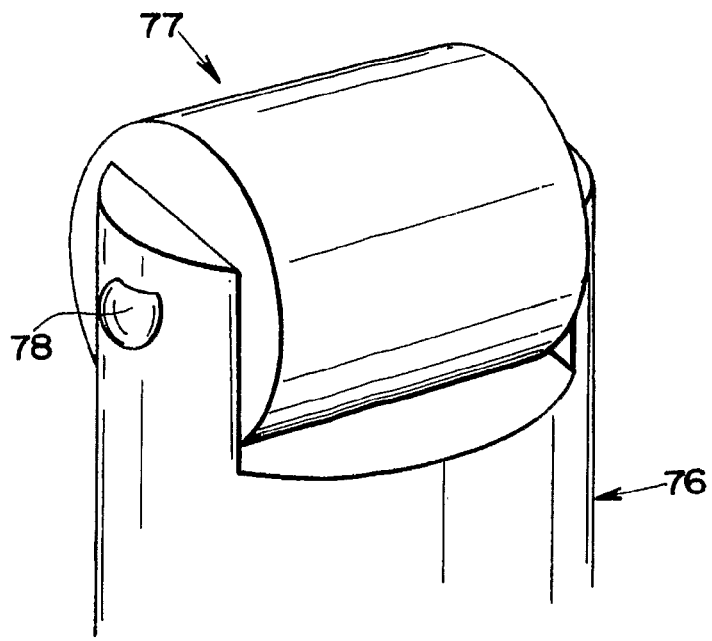
FIG. 11 is a perspective view showing a roller and a piston adopted to the oil pump shown in FIGS. 9 and 10.

First of all, here will be described the configuration example 1 of the power transmission system according to the invention with reference to FIGS. 9 to 11. An inner race 70 is fitted to the outer circumference of the crankshaft 6. The inner race 70 is shaped into annular shape, and capable of moving relatively to the crankshaft 6 in the direction of the rotation axis. Moreover, a sprine mechanism 71 is provided to move the inner race 70 and the crankshaft 6 relatively to each other in the direction of the rotation axis. The spline mechanism 71 comprises an external tooth 72 formed on the outer circumference of the crankshaft 6 and an internal tooth 73 formed on the inner circumference of the inner race 70. The external tooth 72 and the internal tooth 73 are meshing with each other. Thus, the crankshaft 6 and the inner race 70 are movable relatively to each other in the axial direction, whereas the crankshaft 6 and the inner race 70 are not movable relatively to each other in the direction of the rotation axis.

There is provided a plurality of cylinders 75 in the inner race 70 in the circumferential direction. Each cylinder 75 is opened to the outer circumferential face of the inner race 70, and a piston 76 is arranged respectively in each cylinder 75. Each piston 76 is movable in the radial direction of the inner race 70, i.e., in the direction of axis B1, and a roller 77 is placed on the end portion of each piston 76 exposed outside of the cylinder 75, as illustrated in FIG. 11. Each roller 77 is capable of rotating around a shaft 78 which is in parallel with the rotation axis A1. Moreover, the roller 77 is subjected to the process for reducing the friction coefficient of its surface. For example, hard chrome-plating, the diamond-like carbon coating or the like is applied to the surface of the roller 77. In each cylinder 75, the oil chamber 14 is formed between a deep end face 76 of the cylinder 75 and the piston 76. The elastic member 15 for pushing the piston 76 outwardly is arranged in the oil chamber 14.

In the inner race 70, moreover, there are formed an oil passages 78 and 79 communicating with each oil chamber 14. The oil suction passage 16 and the oil discharging passage 17 are formed in the crankshaft 6. An oil passage 80 connected to the oil suction passage 16, and an oil passage 81 connected to the oil discharging passage 17, are also formed in the crankshaft 6. On the circumference of the crankshaft 6, there are formed an oil groove 82 communicating with the oil passage 80, and an oil groove 83 communicating with the oil passage 81. Moreover, the length of the oil groove 82 in the direction of the rotation axis is so set as to constantly maintain the communication between the oil groove 82 and the oil passage 78 of the inner race 70, even if the inner race 70 slides on the outer circumference of the crankshaft 6 within a predetermined range, in the direction of the rotation axis. Furthermore, the length of the oil groove 83 in the direction of the rotation axis is so set as to constantly maintain the communication between the oil groove 83 and the oil passage 79 of the inner race 70, even if the inner race 70 slides on the outer circumference of the crankshaft 6 within a predetermined range, in the direction of the rotation axis.

On the other hand, a sealing devices 100 are installed on a different portion of the outer circumference of the crankshaft 6, in the direction of the rotation axis. These sealing devices 100 prevent a leakage of the oil in the oil groves 82 and 83 from between the crankshaft 6 and the inner race 70. Moreover, the oil passage 78 is provided with a check valve 84, and the oil passage 79 is provided with a check valve 85. This check valve 84 allows the oil of the oil suction passage 16 to flow into the oil chamber 14, and prevents the oil of the oil chamber 14 from flowing backward to the oil suction passage 16. Also, the check valve 85 allows the oil of the oil suction passage 17 to be discharged to the oil chamber 14, and prevents the oil of the oil chamber 14 from flowing backward to the oil discharging passage 17. Furthermore, a shift fork 86 is connected to the inner race 70: This shift fork 86 is operated in accordance with the shift position selected by the driver of the vehicle, and an operating power thereof is transmitted to the inner race 70 so that the inner race 70 is slid on the outer circumference of the crankshaft 6 in the direction of the rotation axis.

On the other hand, the sun gear 39 of the forward/backward switching mechanism 37 rotates integrally with the input shaft 2, and the ring gear 40 is fixed to the casing 60. Also, there is provided an outer race 87, which is connected to the input shaft 2 so as to rotate integrally therewith. The outer race 87 is shaped into an annular shape, and the cam face 36 is formed on the inner circumference of the outer race 87. Moreover, there is provided an outer race 88 which is connected to the carrier 43 so as to rotate integrally therewith, and the cam face 36 is also formed on the inner circumference of the outer race 88. As can be seen from the section perpendicular to the rotation axis A1, the shape of the cam face 36 of the outer race 88, and the shape of cam face 36 of the outer race 87 are congruent with each other. Moreover, the outer race 87 and the outer race 88 are arranged coaxially with each other at the different positions. Specifically, the outer race 88 is positioned between the engine 1 and the outer race 87. Besides, the remaining configuration in the embodiment 3 is identical to that in the embodiment 1.

Here will be described the action of the configuration of the embodiment 3. In this embodiment 3, the position of the inner race 70 in the direction of the rotation axis on the outer circumference of the crankshaft 6 is determined in accordance with the shift position selected by the driver of the vehicle. In case a forward position is selected, for example, the inner race 70 migrates to the left side in FIG. 9. In this case, each piston 76 is positioned in the inner space of the outer race 87, and each roller 77 is contacted with the cam face 36 of the outer race 87. In case a reverse position is selected, on the other hand, the inner race 70 migrates to the right side in FIG. 9. In this case, each piston 76 is positioned in the inner space of the outer race 88, and each roller 77 is contacted with the cam face 36 of the outer race 88. Thus, as a result of the shifting of shift position, the roller 77 migrates between the cam faces 36 of the outer race 87 and 88.

In case the forward position is selected, as has been described above, the torque of the crankshaft 6 is transmitted to the outer race 87 through the inner race 70, the piston 76 and the roller 77, and the outer race 87 and the input shaft 2 are thereby rotated integrally. In this embodiment 3, since the ring gear 40 is fixed, the pinion gears 41 and 42 are rotated also, and the carrier 43 is idled. In case the reverse position is selected, on the other hand, the torque of the crankshaft 6 is transmitted to the outer race 88 through the inner race 70, the piston 76 and the roller 77. In this embodiment 3, since the ring gear 40 is fixed, the ring gear 40 acts as a reaction element so that the input shaft 2 rotates in the direction opposite to that of the crankshaft 6 and the carrier 43.

As has been described above, the roller 77 rolls along with the cam face 36 when the engine torque is transmitted to the crankshaft 6, regardless of whether the shifting position is in the reverse position or in the forward position. Here, since the cam face 36 is formed into a wavy shape in which protrusions and recesses are formed alternately in the radial direction, the piston 76 reciprocates radially along with the axis B1. When the piston 76 moves outwardly, the pressure in the oil chamber 14 becomes negative. Therefore, the oil in the oil suction passage 18 flows into the oil chamber 14 through the oil suction passage 16 and the oil passage 80. In this case, the check valve 85 is closed to prevent the oil of the oil discharging passage 17 from flowing adversely back to the oil chamber 14.

In case the piston 76 moves inwardly and the oil pressure is raised in the oil chamber 14, on the other hand, the oil of the oil chamber 14 is fed to the control valve 37 described in the embodiment 1 through the oil passage 81, and the oil discharging passages 17 and 19. Then, the piston 76 reciprocates repeatedly in the axial direction, and the oil is fed from the oil pump 7 to the hydraulic control unit 26. In this embodiment 3, it is also possible to control the capacity of the torque transmitted between the crankshaft 6 and the input shaft 2, and the oil discharge amount of the oil pump 7, by controlling the section area of the port C1 of the control valve 37, on the principle described in the embodiment 1. That is, the oil pump 7 comprises: a function to control the amount of the oil fed to the hydraulic control unit 26; a function as a clutch to control the torque capacity; and a function as a damper. For this reason, the effects achieved by the configuration of the embodiment 1 can also be attained by the embodiment 3. In addition, the control examples 1 to 3 are practicable and effects of those are feasible also in the embodiment 3.

CONFIGURATION EXAMPLE 2

Figure 12:
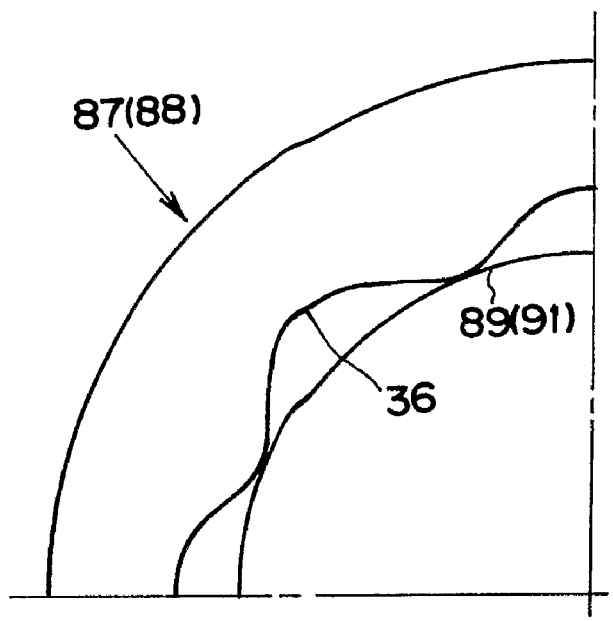
FIG. 12 is a diagram showing a configuration example of an outer race of the oil pump according to the invention.
Figure 13:
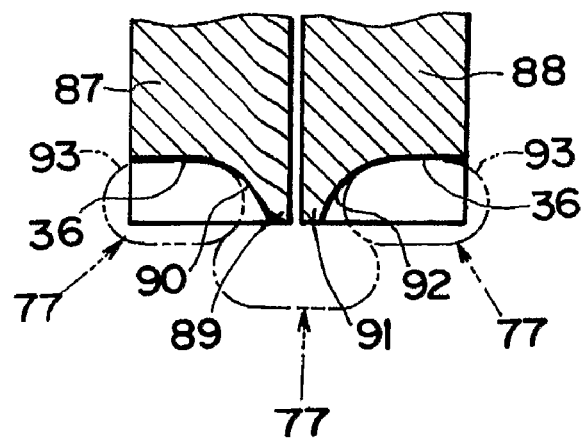
FIG. 13 is a sectional view of the outer race shown in FIG. 12.

Next, another configuration example 2 of the embodiment 3 will be described with reference to FIGS. 12 and 13. This configuration example 2 is basically similar to the configuration example 1; however, the configuration example 2 comprises a structure for smoothening the movement of the roller 77 between the outer races 87 and 88. This is the difference between the configuration examples 2 and 3. In FIGS. 12 and 13, there is formed an annular rib 89 in the inner circumference of the end portion of the outer race 87 in the outer race 88 side. A curved face 90 extending to the cam face 36 is formed on the side face of the rib 89. On the other hand, there is formed an annular rib 91 in the inner circumference of the end portion of the outer race 88 in the outer race 87 side. A curved face 92 extending to the cam face 36 is formed on the side face of the rib 91. Internal diameters of the ribs 89 and 91 are identical to the diameter of an (not shown) inscribed circle of the cam face 36. Moreover, there is formed a round portion 93 having a predetermined radius on both of the end portions of the roller 77 in the axial direction.

According to the configuration of the FIGS. 12 and 13, in case the roller 77 contacting with one of the cam faces 36 moves in the direction of the rotation axis, the round portion 93 contacts with the curved face 90 or 92, and then runs on the leading end of the ribs 89 or 91. After this, the round portion 93 moves to the other cam face 36. Therefore, it is possible to move the roller 77 smoothly from one of the cam face 36 to the other cam face 36, even if the phases of the outer races 87 and 88 in the circumferential direction, i.e., the phases of unevenness of the cam faces 36 are different. Additionally, in case a neutral position or a parking position is selected, if the roller 77 is halted on the ribs 89 and 91, as illustrated in FIG. 3, the piston 76 does not move radially even when the crankshaft 6 rotates. Therefore, the torque is not transmitted between the crankshaft 6 and the input shaft 2, and the oil is not discharged from the oil pump 7. The control examples 1 to 3 can be carried out in the power transmission system in which the configuration example 2 is applied to the oil pump 7.

Here will be described the corresponding relations between the configuration of the embodiment 3 and the configuration of the invention. The sun gear 39, the ring gear 40 and the carrier 43 correspond to "three rotary elements capable of rotating differentially" of the invention; the sun gear 39 and the carrier 43 correspond to "two rotary elements" of the invention; the inner race 70 corresponds to a first rotary member of the invention; the outer races 87 and 88 correspond to a second rotary member of the invention; the outer race 87 corresponds to a first construction member of the invention; and the outer race 88 corresponds to a second construction member of the invention. Specifically, the outer race 87 serves as both the second rotary member and the first construction member of the invention, and the outer race 88 serves as both the second rotary member and the second construction member of the invention. Moreover, the direction of the rotation axis corresponds to "a predetermined direction" of the invention; the roller 77 corresponds to a transmitting member of the invention; the cam face 36 corresponds to the cam of the invention; the sprine mechanism 71 and the shift fork 86 correspond to a connecting mechanism of the invention; and the curved faces 90 and 92, and the ribs 89 and 91 correspond to a smoothing mechanism of the invention. Also, the piston 76 and the roller 77 correspond to a transmission member of the invention. Here, the corresponding relation between the remaining configuration of the embodiment 3 and the configuration of the invention is similar to that between the configuration of the embodiment 1 and the configuration of the invention.

Embodiment 4

Figure 18:
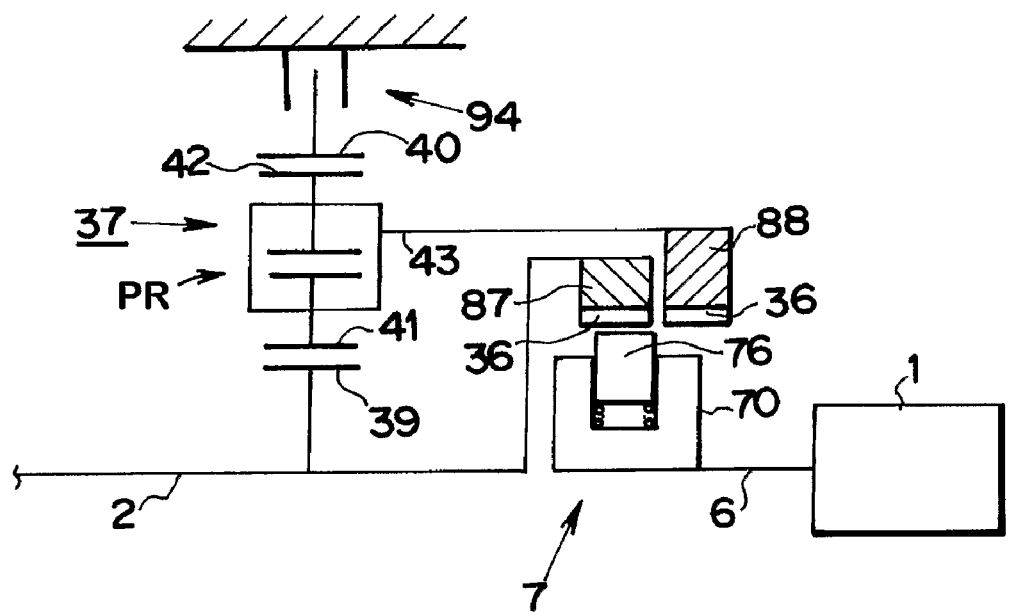
FIG. 18 is a conceptional view showing another configuration example of the power transmission system according to the invention.
Figure 19:
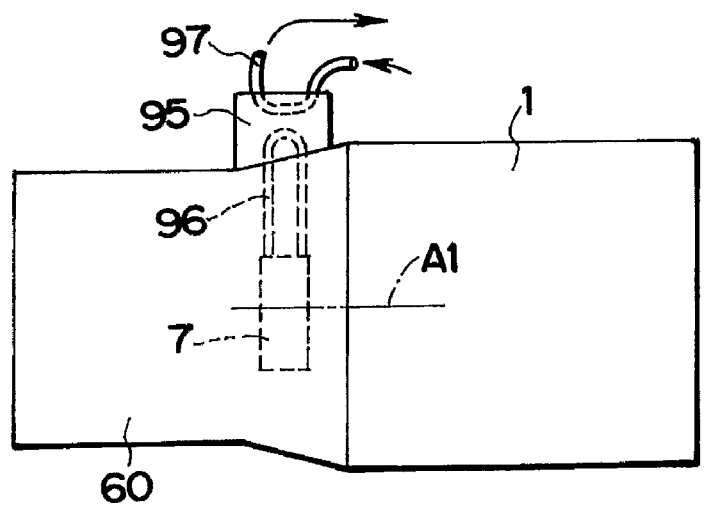
FIG. 19 is a conceptional view showing the case of exchanging a heat between the oil pump and the engine according to the invention.

Next, here will be described the embodiment 4 of the invention with reference to FIG. 18. In the embodiment 4, there is provided a brake 94 for allowing or inhibiting the rotation of the ring gear 40 selectively. This is the difference between the embodiment 3 and 4. Engagement and release of the brake 94 is controlled by the electronic control unit 53 described in the embodiment 1. The remaining configuration of the embodiment 4 is similar to that of the embodiment 3. In the embodiment 4, the brake 94 is released in case the forward position is selected. For this reason, the carrier 43 and the ring gear 40 rotate integrally with the input shaft 2, when the torque of the crankshaft 6 is transmitted to the input shaft 2.

Therefore, it is possible to prevent the relative rotation between the pinion gear 42 and the ring gear 40, the relative rotation between the pinion gear 41 and the sun gear 39, and the relative rotation between the pinion gear 41 and the pinion gear 42. Consequently, it is possible to suppress deterioration in durability of the forward/backward switching mechanism 37 caused by a high rotational speed of the input shaft 2. In case the reverse position is selected, the brake 94 is engaged and the ring gear 40 acts as a reaction element, so that the torque of the crankshaft 6 is transmitted to the input shaft 2 through the carrier 43. Here, the configuration of FIGS. 12 and 13 may also be applied to the oil pump 7 of FIG. 18.

Here will be described the corresponding relations between the configuration of the embodiment 4 and the configuration of the invention. The pinion gear 41 corresponds to a first pinion gear of the invention; the pinion gear 42 corresponds to a second pinion gear of the invention; the sun gear 39 corresponds to a first rotary element of the invention; the ring gear 40 corresponds to a second rotary element of the invention; and the brake 94 corresponds to a brake of the invention. Although the aforementioned embodiments 3 and 4 are intended for a vehicle having a belt type continuously variable transmission as a continuously variable transmission, the configuration of the embodiments 3 and 4 is applicable to a vehicle having a toroidal type continuously variable transmission as the continuously variable transmission. In short, a toroidal type continuously variable transmission is also included in the continuously variable transmission of the invention.

Embodiment 5

Figure 14:
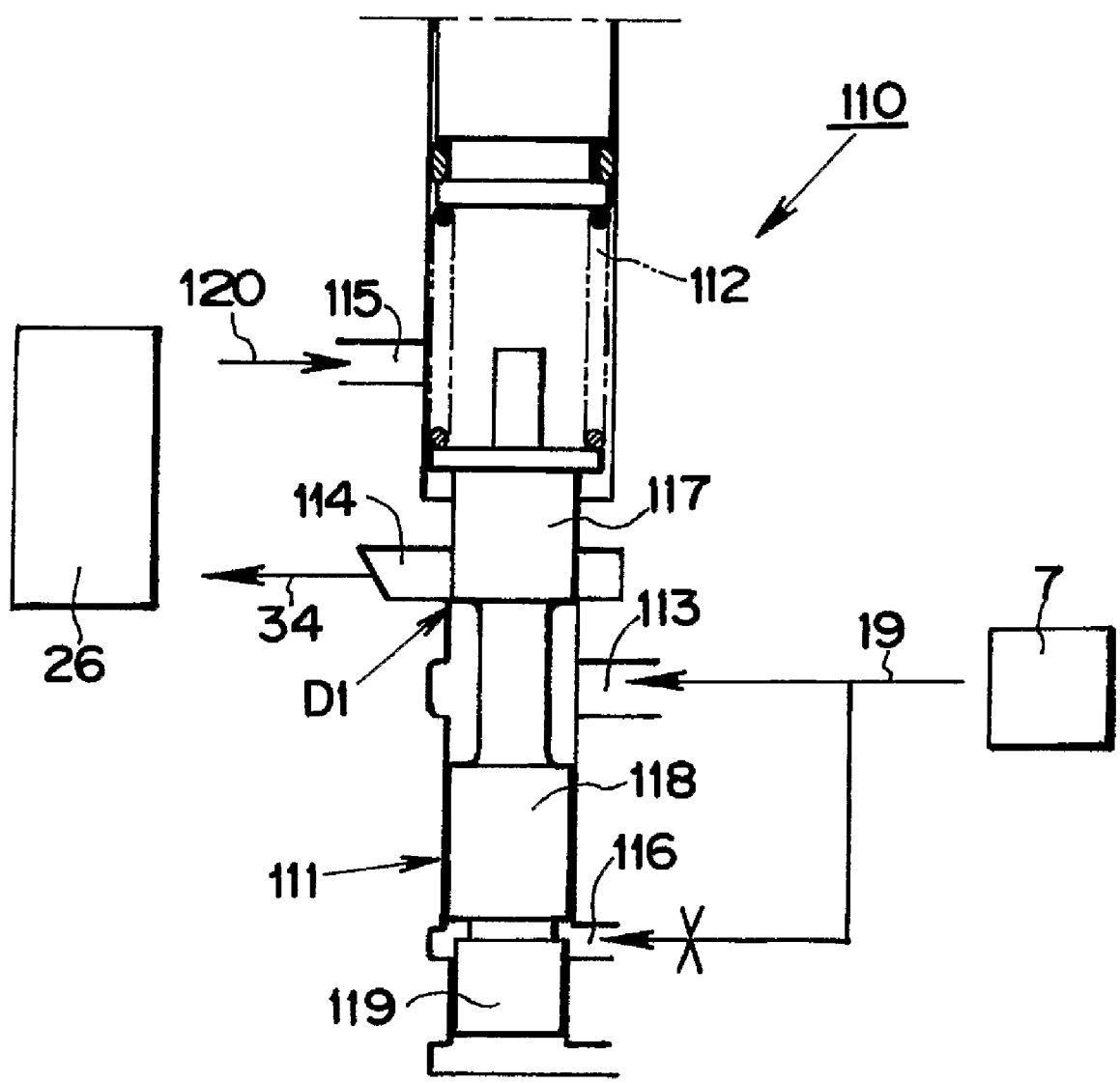
FIG. 14 is a diagram showing another configuration of the control valve shown in FIG. 1.

Next, here will be described the embodiment 5 of the power transmission system according to the invention. In this embodiment 5, there is provided another applicable control valve as an alternative to the control valve 27 shown in FIG. 1. Hereinafter, the control valve corresponding to the embodiment 5 will be described with reference to FIG. 14. A control valve 110 shown in FIG. 14 comprises: a spool 111, which is reciprocatable in the axial direction; an elastic member 112 for applying a force to a spool 114 in the downward direction in FIG. 14; a suction port 113; a discharging port 114; a control port 115; and a feedback port 116. A spring or the like may be used as the elastic member 112. The oil discharging passage 19 is connected to the suction port 113 and the feedback port 116, and the oil discharging port 114 is connected to the oil passage 34.

On the other hand, there are formed lands 117, 118 and 119 in the spool 111. A force for pushing the spool 111 in the direction opposite to that of the force of the elastic member 112 is generated in accordance with the oil pressure of the feedback port 116. Also, a force for pushing the spool 111 in the same direction as the force of the elastic member 112 is generated by the oil pressure of the control port 115. A control oil pressure to be inputted to the control port 115 through an oil passage 120 is regulated in the hydraulic control unit 26 on the basis of the control signal of the electronic control unit 53. The control valve 110 corresponds to the control valve of the invention; a port D1 corresponds to the port of the invention; the feedback port 116 corresponds to a feedback port of the invention; the spool 111 corresponds to a spool of the invention; and the elastic member 112 corresponds to an elastic member of the invention.

In the control valve 110 thus constructed, the axial movement of the spool 111 is controlled based on the corresponding relation between: the force applied to the spool 111 in accordance with the oil pressure transmitted from the oil discharging passage 19 to the feedback port 116; and a total of the force applied to the spool 111 by the elastic member 112, and the force applied to the spool 111 in accordance with the oil pressure of the control port 115. By this control, the section area of the port D1 between the oil discharging passage 19 and the oil passage 34, or the flow amount of the oil fed from the oil discharging passage 19 to the oil passage 34 is adjusted. Specifically, when the oil pressure in the oil discharging passage 19 is raised, the oil pressure of the feedback port 116 is raised. Consequently, the spool 111 is moved upwardly in FIG. 14.

For this reason, the section area of the port D1 is enlarged, and the flow amount of oil discharged from the oil discharging passage 19 to the oil passage 34 is increased. The pressure raise in the discharge pressure of the oil pump 7 is thereby suppressed. In case the oil pressure of the oil discharging passage 19 drops, on the other hand, the oil pressure of the feedback port 116 is lowered so that the spool 111 moves in the downwardly in FIG. 14. As a result, the section area of the port D1 is reduced so that the flow amount of the oil discharged from the oil discharging passage 19 to the oil passage 34 is reduced. The drop in the discharge pressure of the oil pump 7 is thereby suppressed. Additionally, if the control oil pressure inputted to the control port 115 is raised, the section area of the port D1 is not enlarged easily. Therefore, the drop in the discharge pressure of the oil pump 7 is suppressed, or the discharge pressure of the oil pump 7 is raised. On the contrary, if the control oil pressure inputted to the control port 115 is lowered, the section area of the port D1 is enlarged easily. Therefore, the raise of the discharge pressure of the oil pump 7 is suppressed, or the discharge pressure of the oil pump 7 is lowered.

CONTROL EXAMPLE 4

Figure 15:
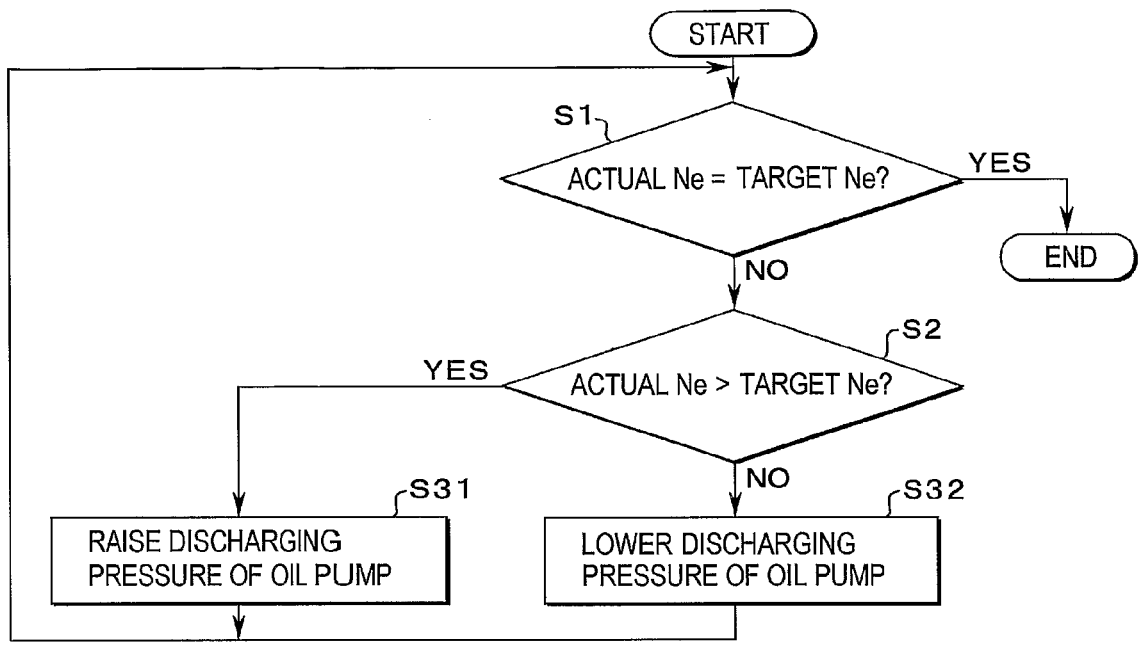
FIG. 15 is a flowchart showing a control example 4 practicable in the vehicle having the control valve illustrated in FIG. 14.

Here will be described a control example 5 practicable in the power transmission system having the control valve 110 of the embodiment 5, with reference to the flowchart of FIG. 15. In the flowchart of FIG. 15, the processes of Steps S1 and S2 are similar to the processes of Steps S1 and S2 in FIG. 5. In this example, in case the answer of Step S2 in FIG. 15 is YES, a control for raising the discharge pressure of the oil pump 7 is executed (at Step S31), and the routine is returned to Step S1. In case the answer of Step S2 in FIG. 15 is NO, on the contrary, a control for lowering the discharge pressure of the oil pump 7 is executed (at Step S32), and the routine is returned to Step S1. In addition, the effect of the process of Step S31 is similar to the effect of the process of Step S3 in FIG. 5, and the effect of the process of Step S32 is similar to the effect of the process of Step S4 in FIG. 5.

CONTROL EXAMPLE 5

Figure 16:
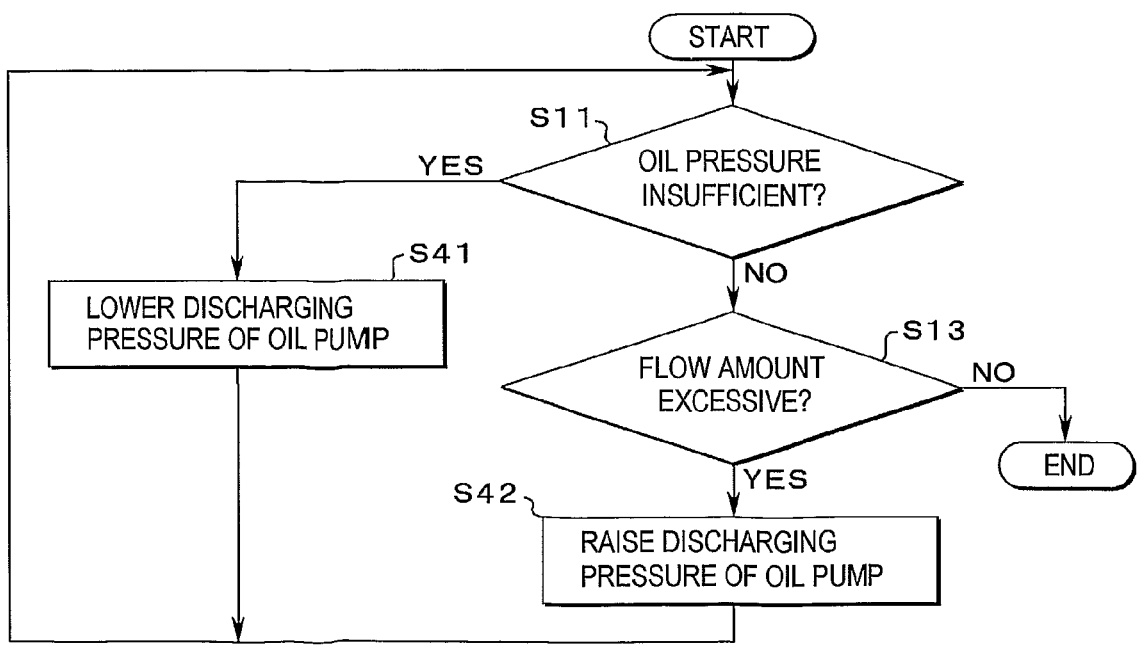
FIG. 16 is a flowchart showing a control example 5 practicable in the vehicle having the control valve illustrated in FIG. 14.

Here will be described another control example practicable in the power transmission system having the control valve 110 of the embodiment 5, with reference to the flowchart of FIG. 16. In the flowchart of FIG. 16, the processes of Steps S11 and S13 are similar to the processes of Steps S11 and S13 in FIG. 6. In this example, in case the answer of Step S11 in FIG. 16 is YES, a control for lowering the discharge pressure of the oil pump 7 is executed (at Step S41), and the routine is returned to Step S11. In case the answer of Step S13 in FIG. 16 is YES, a control for raising the discharge pressure of the oil pump 7 is executed (at Step S42), and the routine is returned to Step S11. In addition, the effect of the process of Step S41 is similar to the effect of the process of Step S12 in FIG. 6 and the effect of the process of Step S42 is similar to the effect of the process of Step S14 in FIG. 6.

CONTROL EXAMPLE 6

Figure 17:
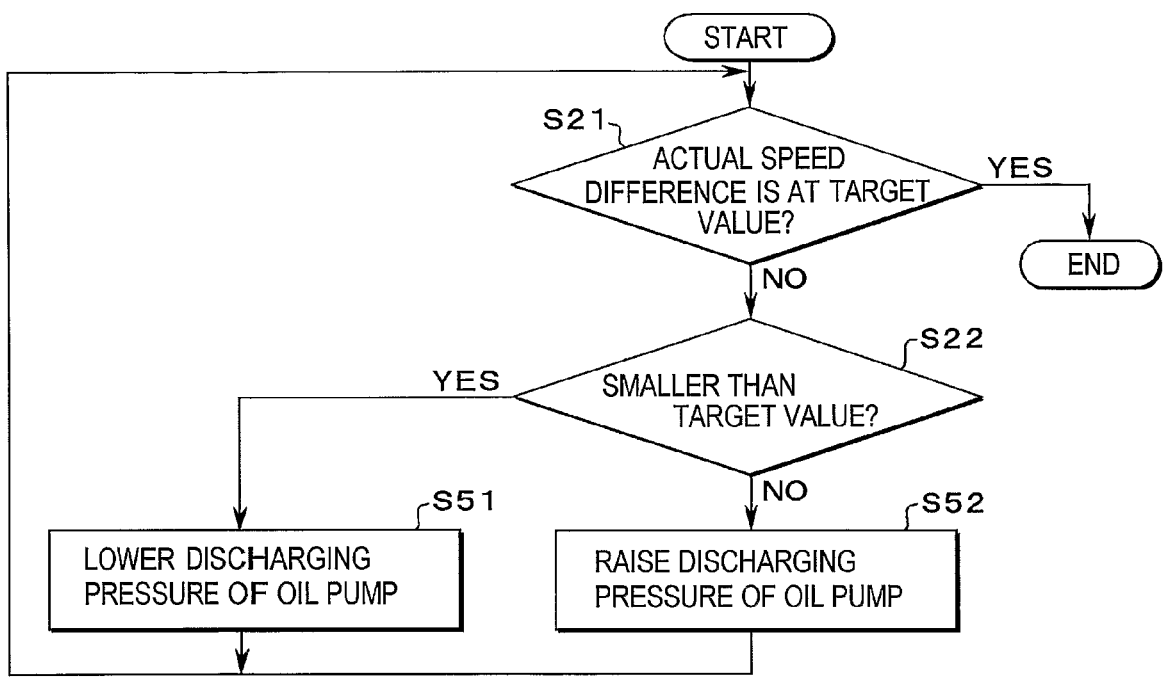
FIG. 17 is a flowchart showing a control example 6 which can be executed in the vehicle having the control valve illustrated in FIG. 14.

Here will be described another control example practicable in the power transmission system having the control valve 110 of the embodiment 5, with reference to the flowchart of FIG. 17. In the flowchart of FIG. 17, the processes of Steps S21 and S22 are similar to the processes of Steps S21 and S22 of FIG. 7. In this example, in case the answer of Step S22 in FIG. 17 is YES, a control for lowering the discharge pressure of the oil pump 7 is executed (at Step S51), and the routine is returned to Step S21. In case the answer of Step S22 in FIG. 17 is NO, a control for raising the discharge pressure of the oil pump 7 is executed (at Step S52), and the routine is returned to Step S21. In addition, the effect of the process of Step S51 is similar to the effect of the process of Step S23 in FIG. 7, and the effect of the process of Step S52 is similar to the effect of the process of Step S24 in FIG. 7.

Here will be described the corresponding relation between the configuration described with reference to the flowcharts of FIGS. 15 to 17 and the configuration of the invention. The oil discharge pressure of the oil pump 7 corresponds to the "discharge condition of the oil pump" of the invention.

Embodiment 6

Here will be described the embodiment 6 practicable in combine with the configuration of the aforementioned embodiments 1 to 5, with reference to FIG. 18. In the embodiment 6, a heat exchanger 95 is provided outside of the casing 60. Moreover, there is provided a pipe 96. This pipe 96 feeds the oil discharged from the oil pump 7 to the heat exchanger 95, and then returns the oil from the heat exchanger 95 to the oil pump 7. There is further provided a pipe 97. This pipe 97 feeds a fluid (i.e., cooling water), which is thermally transferred from the engine 1, to the heat exchanger 95, and then return the fluid to the engine 1 side. In the heat exchanger 95, the heat of the fluid flowing through the pipe 97 is transferred to the oil flowing through the pipe 96. The oil is thereby heated. The viscosity of the oil can be increased at the cooling time by thus heating the oil.

As has been described in the embodiments 1 to 5, the oil pump 7 has the function as the clutch. For this reason, also in the embodiment 6, it is unnecessary to provide a friction clutch, an electromagnetic clutch, a fluid transmission mechanism and so on, between the oil pump 7 and the engine 1 in the direction of the rotation axis of the crankshaft 6. Consequently, the distance between the engine 1 and the oil pump 7 in the direction of the rotation axis can be shortened as much as possible. Therefore, the temperature drop in the fluid flowing through the pipe 97 can be suppressed, and the functional deterioration in the heat exchanger 95 is thereby prevented. Additionally, the elements in the embodiments 1 to 5, such as the inner race, the outer race, the piston, the ball and the roller and so on are made of a metal material.

INDUSTRIAL APPLICABILITY

This invention relates to a power transmission system comprising an input member and an output member through which a power is transmitted, and an oil pump which is driven by the power transmitted between the input member and the output member, and which discharges oil by the relative rotation between a first rotary member and a second rotary member. Therefore, the power transmission system of the invention can be arranged on the route from a prime mover to wheels in a vehicle. Particularly, it is possible to use the oil pump as a clutch for controlling a power transmitting condition between the first rotary member and the second rotary member, i.e., a power transmitting condition between the prime mover and the wheels, by controlling the oil discharge condition of the oil pump.

The invention claimed is:

1. A power transmission system including
an input member and an output member that transmits power;
an oil pump that discharges oil by a relative rotation between a first rotary member and a second rotary member, and which is driven by the power transmitted between the input member and the output member;
a transmission member that connects the first rotary member and the second rotary member in a power transmittable manner;
a control valve that controls a power transmission state between the first rotary member and the second rotary member, by controlling an oil discharge condition of the oil pump; and a controller that controls the discharge condition of the oil pump by controlling the control valve on the basis of an operating condition of a vehicle, wherein the input member and the first rotary member are connected with each other in a power transmittable manner, and the output member and the second rotary member are connected with each other in a power transmittable manner;

wherein the transmission member is configured to increase torque transmitted between the first rotary member and the second rotary member in accordance with a reduction of the discharge amount of the oil pump, or a rise in a discharge pressure of the oil pump, and wherein the controller includes a device that controls the control valve so that the discharge amount of the oil pump is reduced, or so that the discharge pressure of the oil pump is raised, according to an increase in a target value of the torque transmitted between the input member and the output member.

2. The power transmission system as claimed in claim 1, wherein the oil pump is a radial piston pump including a piston which is arranged in any one of the first rotary member and the second rotary member, and which acts radially in a direction perpendicular to a rotation axis of the first rotary member and the second rotary member.

3. The power transmission system as claimed in claim 1, further comprising:

a planetary gear mechanism including three rotary elements capable of rotating differentially;

wherein the second rotary member includes a first construction member and a second construction member, which are connected individually with two rotary elements of the planetary gear mechanism, wherein the first construction member and the second construction member are arranged coaxially in a predetermined direction, and wherein a coupling mechanism connects the first rotary member selectively with the first construction member or the second construction member in a torque transmittable manner, by moving the transmission member in a predetermined direction.

4. The power transmission system as claimed in claim 3, wherein the oil pump is a radial piston pump including a piston which is arranged in the first rotary member, and which acts radially in a direction perpendicular to the rotation axis of the first rotary member and the second rotary member;

wherein the piston is equipped with the transmission member;

wherein the first construction member and the second construction member are provided individually with a cam to which the transmission member is contacted;

wherein the cam of the first construction member and the cam of the second construction member are arranged coaxially in a predetermined direction; and wherein a smoothing mechanism smoothes a movement of the transmission member between the cam of the first construction member and the cam of the second construction member.

5. The power transmission system as claimed in claim 3, wherein the planetary gear mechanism is a double-pinion type planetary gear mechanism, including
a sun gear as the first rotary element,
a ring gear as the second rotary element, and
a carrier as the third rotary element that holds a first pinion gear that meshes with the sun gear and a second pinion gear that meshes with the first pinion gear, wherein the first construction member is connected with the sun gear, and the second construction member is connected with the carrier; and wherein a brake allows the ring gear to rotate when the transmission member and the first construction member are connected with each other in a power transmittable manner.

6. The power transmission system as claimed in claim 1, further comprising:
a transmission to which the power of the output member of the oil pump is transmitted.

7. The power transmission system as claimed in claim 6, further comprising: a hydraulic control unit that controls the transmission.

8. The power transmission system as claimed in claim 7,
wherein the transmission includes a hydraulic servo mechanism, and
wherein the oil pressure or the flow amount of an operating oil to be fed to the hydraulic servo mechanism is controlled by the hydraulic control unit.

9. The power transmission system as claimed in claim 6, wherein the output member is an input shaft of the transmission.

10. The power transmission system as claimed in claim 1, further comprising:
a prime mover that generates a driving force to run the vehicle, and
wherein the power of the prime mover is transmitted to the input member.

11. The power transmission system as claimed in claim 10,
wherein the prime mover is an engine; and
wherein the input member is a crankshaft of the engine.

12. The power transmission system as claimed in claim 1, further comprising: a hydraulic control unit to which operating oil is fed.

13. The power transmission system as claimed in claim 7, wherein the hydraulic control unit is fed operating oil discharged from the oil pump.

14. The power transmission system as claimed in claim 12, wherein the hydraulic control unit is fed operating oil discharged from the oil pump.

15. The power transmission system as claimed in claim 1, wherein power of a prime mover, that generates a driving force to run the vehicle, is transmitted to a wheel through the oil pump, the transmission, and a differential.

16. The power transmission system as claimed in claim 6, wherein the transmission includes a forward/backward switching mechanism, and a continuously variable transmission.

17. The power transmission system as claimed in claim 15, wherein the transmission includes a forward/backward switching mechanism, and a continuously variable transmission.

18. The power transmission system as claimed in claim 2,
wherein power of a prime mover is transmitted to the second rotary member through the first rotary member;
wherein the piston is arranged in the first rotary member;
wherein the cam is arranged in a circumferential direction of the second rotary member; and
wherein the piston moves radially due to a rotational transfer in the circumferential direction of the cam resulting from the relative rotation between the first rotary member and the second rotary member.

19. The power transmission system as claimed in claim 1,
wherein the control valve includes a spool with an action controlled by energizing a solenoid, and a port connected with an oil discharging passage of the oil pump; and
a section area of the port is controlled by the action of the spool which controls the oil discharge amount of the oil pump.

20. The power transmission system as claimed in claim 1, further comprising:
a prime mover that generates a driving force to run the vehicle,
wherein power of the prime mover is transmitted from the input member to the output member,
wherein the control valve includes a port connected with an oil discharging passage of the oil pump; and
wherein the controller includes a means for controlling a section area of the port of the control valve on the basis of a result of a comparison between an actual speed and a target speed of the prime mover.

21. The power transmission system as claimed in claim 1, further comprising:
an oil requiring portion to which the oil discharged from the oil pump is fed; and
wherein the control valve includes a port connected with an oil discharging passage of the oil pump; and
wherein the controller includes a means for controlling a section area of the port of the control valve on the basis of a result of a determination of the oil pressure and the feeding amount required in the oil requiring portion.

22. The power transmission system as claimed in claim 1, wherein the control valve includes a port connected with an oil discharging passage of the oil pump; and
wherein the controller includes a means for controlling a section area of the port of the control valve on the basis of a result of a determination of a speed difference between the first rotary member and the second rotary member.

23. The power transmission system according to claim 12, wherein the oil discharged from the oil pump to the oil discharging passage is fed to the hydraulic control unit through the control valve; and
the control valve includes,
a port connected with an oil discharging passage,
a spool that controls a section area of the port, which is reciprocatable in an axial direction,
an elastic member that applies an elastic force to the spool in the axial direction,
a control port, to which a control oil pressure regulated by the hydraulic control unit is input, and which applies a force to the spool in a same direction as the force applied by the elastic member, and
a feedback port, which is connected with the oil discharging passage of the oil pump, and to which the oil pressure applies a force to the spool in a direction opposite to the force applied to the spool by the elastic member is input.

24. The power transmission system according to claim 23, wherein the controller includes a means for controlling a discharge pressure of the oil pump on the basis of a result of comparison between an actual speed and a target speed of the prime mover.

25. The power transmission system according to claim 23, further comprising:
an oil requiring portion to which the oil discharged from the oil pump is fed; and
wherein the controller includes a means for controlling the discharge pressure of the oil pump by controlling the control valve on the basis of a result of a determination of the required oil pressure and the required feeding amount of the oil in the oil requiring portion.

26. The power transmission system according to claim 23, wherein the controller includes a means for controlling the discharge pressure of the oil pump by controlling the control valve on the basis of a result of determination of a speed difference between the first rotary member and the second rotary member.

27. The power transmission system as claimed in claim 1,
wherein the controller includes a device that controls the control valve so that the discharge amount or the discharge pressure of the oil pump is adjusted to a target value of a speed difference between the first rotary member and the second rotary member; and
wherein the target value of the speed difference between the first rotary member and the second rotary member is determined,
by determining a target value of the torque transmitted between the first rotary member and the second rotary member so that vibration and noise resulting from a fluctuation of the torque transmitted from the input member to the output member is suppressed within a permissible value, and
by determining a target speed difference between the first rotary member and the second rotary member on the basis of the determined target value of the torque.

28. The power transmission system as claimed in claim 1, wherein the controller includes a device that controls the control valve so that the discharge amount or the discharge pressure of the oil pump is adjusted in accordance with a fluctuation of torque transmitted from the input member to the output member.

* * * * *